US007567963B2

(12) United States Patent
Shpeisman et al.

(10) Patent No.: US 7,567,963 B2
(45) Date of Patent: Jul. 28, 2009

(54) THREAD SYNCHRONIZATION WITH LOCK INFLATION METHODS AND APPARATUS FOR MANAGED RUN-TIME ENVIRONMENTS

(75) Inventors: Tatiana Shpeisman, Menlo Park, CA (US); Ali-Reza Adl-Tabatabai, Santa Clara, CA (US); Brian Murphy, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 695 days.

(21) Appl. No.: 10/878,210

(22) Filed: Jun. 28, 2004

(65) Prior Publication Data

US 2005/0289546 A1    Dec. 29, 2005

(51) Int. Cl.
*G06F 7/00* (2006.01)
(52) U.S. Cl. .......................... 707/8; 718/102; 718/100; 719/312
(58) Field of Classification Search ................. 718/100, 718/102; 707/8; 719/312
See application file for complete search history.

(56) References Cited

U.S. PATENT DOCUMENTS

| 5,317,737 | A |   | 5/1994 | Barton et al. |
| 6,330,714 | B1 |   | 12/2001 | Hicks et al. |
| 6,735,760 | B1 | * | 5/2004 | Dice ........................... 717/139 |
| 6,772,153 | B1 | * | 8/2004 | Bacon et al. .................... 707/8 |
| 6,792,601 | B1 | * | 9/2004 | Dimpsey et al. ............ 718/102 |
| 6,988,099 | B2 | * | 1/2006 | Wiser et al. ..................... 707/8 |
| 2001/0014905 | A1 | * | 8/2001 | Onodera ...................... 709/102 |
| 2003/0097360 | A1 | * | 5/2003 | McGuire et al. ................ 707/8 |
| 2003/0191757 | A1 | * | 10/2003 | Ambrosini et al. ............. 707/3 |
| 2004/0025169 | A1 |   | 2/2004 | Wiser et al. |
| 2005/0144170 | A1 | * | 6/2005 | Wiser et al. .................... 707/8 |
| 2005/0273782 | A1 |   | 12/2005 | Shpeisman et al. |

OTHER PUBLICATIONS

Patent Cooperation Treaty, International Preliminary Report on Patentability for PCT/US2005/020548, Jan. 11, 2007, 7 pages.
International Search Report corresponding to International application No. PCT/US2005/020548, mailed Nov. 24, 2005, 4 pages.
Written Opinion of the International Searching Authority corresponding to International application No. PCT/US2005/020548, mailed Nov. 24, 2005, 5 pages.
Bacon et al., *Thin Locks: Featherweight Synchronization for Java*, ACM Sigplan Notices, ACM, Association for Computing Machinery, vol. 33, No. 5, May 1998, pp. 258-268.
International Business Machines Corporation, *Fast recursive locking in Java*, Research Disclosure, Kenneth Mason Publications, vol. 433, No. 103, May 2000, 1 page.

(Continued)

*Primary Examiner*—Apu M Mofiz
*Assistant Examiner*—Thu Nga Nguyen
(74) *Attorney, Agent, or Firm*—Hanley Flight & Zimmerman, LLC

(57) ABSTRACT

Thread synchronization with lock inflation methods and apparatus for managed run-time environments are disclosed. An example method disclosed herein comprises determining a locking operation to perform on a lock corresponding to the object, performing an optimistically balanced synchronization of the lock if the locking operation is not unbalanced, and modifying a lock shape of the lock if the locking operation is unbalanced.

30 Claims, 12 Drawing Sheets

OTHER PUBLICATIONS

D.F. Bacon, R. Konuru, C. Murthy, and M. Serrano. Thin Locks:Featherweight Synchronizaiton for Java. *Conference on Programming Languages Design and Inplementation*, 1998, pp. 258-268.

K. Kawachiya, A. Koseki, T. Onodera, "Lock Reservation: Java Locks Can Mostly do Without Atomic Operations," Object-Oriented Programming, Systems, Languages and Applications (OOPSLA), pp. 130-141 (2002).

JJ. Choi, M. Gupta, M. Serrano, V. Sreedhar, S. Midkiff, "Escape Analysis for Java," OOPSLA, pp. 1-19 (1999).

Office Action from U.S. Appl. No. 10/860,692 dated Nov. 25, 2008, 42 pages.

* cited by examiner

Example program:

Method A:
A1: [$threadId_1$, $inflated_1$] = optimisticBalancedAcquireLock($obj_1$)

...

C1: call B($obj_1$)

...

R1: optimisticBalancedReleaseLock($obj_1$, $threadId_1$, $inflated_1$)

Method B:
A2: [$threadId_2$, $inflated_2$] = optimisticBalancedAcquireLock ($obj_1$)
A3: [$threadId_3$, $inflated_3$] = optimisticBalancedAcquireLock ($obj_2$)

...

C2: call C($obj_1$)

...

R2: optimisticBalancedReleaseLock($obj_2$, $threadId_3$, $inflated_3$)
R3: optimisticBalancedReleaseLock($obj_1$, $threadId_2$, $inflated_2$)

Method C:

...

R3: unbalancedReleaseLock($obj_1$)

Synchronization map:
C1 {[&$obj_1$, &$inflated_1$]}
C2 {[&$obj_1$, &$inflated_2$], [&$obj_2$, &$inflated_3$]}

FIG. 10B

| Lock shape before unbalanced release R3: | Lock shape after unbalanced release R3: (assuming $obj_1$ != $obj_2$) |
|---|---|
| $inflated_1$ : false<br>$inflated_2$ : false<br>$inflated_3$ : false | $inflated_1$ : true<br>$inflated_2$ : true<br>$inflated_3$ : false |

THREAD SYNCHRONIZATION WITH LOCK INFLATION METHODS AND APPARATUS FOR MANAGED RUN-TIME ENVIRONMENTS

FIELD OF THE DISCLOSURE

This disclosure relates generally to computers and, more particularly, to thread synchronization with lock inflation methods and apparatus for managed run-time environments.

BACKGROUND

Software environments that support multithreaded applications, for example, JAVA and the European Computer Manufacturers Association (ECMA) Common Language Infrastructure (CLI), typically include a synchronization mechanism for coordinating when one or more threads may access an object. As will be appreciated by those of ordinary skill in the art, a thread refers to a series of processor instructions organized into a single control flow of execution for processing one or more objects. An object is an instance of a class, where a class is a collection of data and methods to operate on such data. In the case of multiple threads of execution, care must be taken to prevent the multiple threads from modifying the same object simultaneously in a way that might place the object in an erroneous state. In particular, a thread may have critical sections that operate on objects that could be accessed simultaneously by another thread. Thus, multi-threaded systems typically provide specialized statements to protect the operation of a thread's critical section from being corrupted by one or more other threads accessing such a shared object during critical section execution.

For example, JAVA source code may include a synchronized statement to protect objects from being accessed simultaneously by different threads. Use of the synchronized statement enables acquisition of an exclusive lock of an object identified by the synchronized statement. Thus, a thread may be prevented from executing a critical section of code until it can obtain an exclusive lock on a particular object identified by a synchronized statement. Moreover, once such a lock is obtained, no other thread can access the locked object, thereby preventing inadvertent corruption of the processing being performed during execution of a critical section of code. Such a locking procedure may be used to ensure that multiple threads cannot access shared objects in a manner that could cause conflicting execution of critical sections of code at the same time. Of course, application of the synchronized statement is generally used in cases where a particular program creates multiple threads to share objects and/or methods. If only one thread ever accesses a particular object and/or method, there is no need to protect it with a synchronized statement.

A synchronized statement in JAVA source code is normally converted to JAVA virtual machine (JVM) instructions, because, as is known in the art, JAVA source code is first compiled into bytecodes (i.e., JVM language) prior to being executed by the JVM. For example, a synchronized statement may be converted to a monitorenter JVM instruction to gain/acquire an exclusive lock on an object. As a compliment to the monitorenter instruction, a monitorexit JVM instruction is provided to unlock/release the exclusive lock on the object. Accordingly, if a thread successfully executes the monitorenter instruction upon an object, that thread gains temporary exclusive lock ownership of the object (i.e., it has gained a lock on the object to prevent other threads from accessing the critical sections of code). If another thread, or second thread, attempts to execute the monitorenter instruction upon the same object while the first thread has temporary exclusive ownership of the object, the second thread must wait (e.g., sleep or spin) until the first thread (i.e., the current lock owner) executes the monitorexit instruction to release its exclusive lock of the object.

Two state variables are typically used to describe the lock state of an object. The first state variable is a lock owner that corresponds to the thread identifier of the thread that currently owns the lock. The lock owner may be set to a NULL value or a NULL thread for the case in which the lock is not owned by any thread. The second state variable is a lock recursion counter that may be used to indicate the number of times that the lock owner has acquired the lock (to support recursive locking). Typically, the lock state of an object is initialized to have a lock owner equal to a NULL value (corresponding to an unlocked state) and a lock recursion counter equal to zero.

Typically, a lockword is used to represent the lock state of an object. A common technique for object locking/synchronization is defined by Bacon, et al. in, ~Thin Lock: Featherweight Synchronization for JAVA," *Conference on Programming Languages Design and Implementation,* 1998, pp. 258-268. Bacon, et al. define a technique based on a lockword that may have two shapes, namely, a thin shape and an inflated shape. A thin lock may include only the thread identifier and lock recursion counter state variables and, due to its relatively small size, may be stored inside a header of the object. An inflated lock may include a number of additional data structures to support object locking/synchronization for scenarios in which a thin lock may not be sufficient (e.g., in the case of lock contention during which a list of threads waiting to acquire the object lock may be needed). Typically, an object is initialized to have a thin lock. The locking/synchronization procedure then inflates the lock, for example, when it becomes too large to fit in the object header (e.g., if there is lock contention and a list of waiting threads is required, if the lock recursion counter exceeds the maximum value that may be represented by the thin lock, etc.). In most implementations, the locking/synchronization procedure does not deflate an inflated lock back to a thin lock (i.e., once the object lock is converted to an inflated lock it remains an inflated lock for the remainder of program execution).

In many prior-art object locking techniques (e.g., prior art implementations of the JVM monitorenter and monitorexit instructions), the lock release function (e.g., corresponding to monitorexit instruction) determines whether a thread attempting to release the lock is actually the lock owner of the lock. Additionally, the lock release function checks the lock recursion counter to determine whether the lock should be unlocked or maintained (e.g., maintained in the locked state due to multiple recursive lock acquisitions). However, most well-formed applications that are written using a higher-level language (e.g., JAVA) and then compiled to bytecodes include matched pairs of lock acquisition and release operations (e.g., matched pairs of monitorenter and monitorexit JVM instructions) and, therefore, exhibit balanced synchronization characteristics (i.e., a locking sequence involving a balanced lock acquisition and release pair performed by the same thread). In code exhibiting balanced synchronization characteristics, the additional overhead of checking the lock owner and the lock recursion counter state variables may be unnecessary and, therefore, may reduce the overall efficiency of the executing application.

BRIEF DESCRIPTION OF THE DRAWINGS

FIGS. 10A-10C illustrate an example operation of the lock manager of FIG. 2.

DETAILED DESCRIPTION

Figure 1:
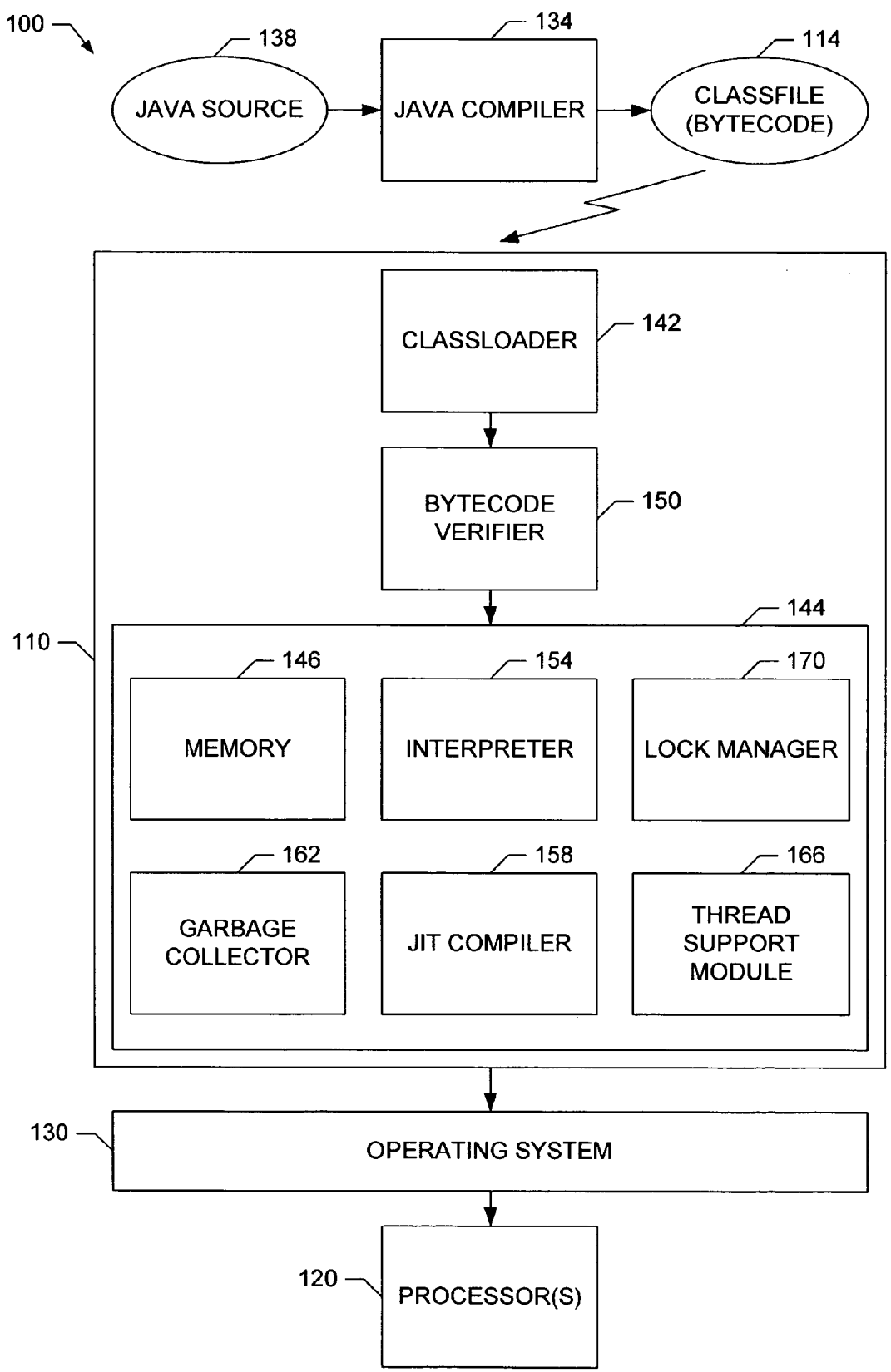
FIG. 1 is a block diagram of an example managed run-time environment in which the example methods, apparatus and articles of manufacture described herein may be employed.

A block diagram of an example environment of use 100 in which the example methods, apparatus and articles of manufacture described herein may be employed is illustrated in FIG. 1. The example environment of use 100 may be implemented, for example, via one or more processor systems such as the example processor system 1100 of FIG. 11 described below. While the example of FIG. 1 corresponds to a JAVA-based managed run-time environment (MRTE), one having ordinary skill in the art will appreciate that the example methods, apparatus and articles of manufacture described herein may be applied to any similar MRTE environment of use, such as, for example, CLI and the associated language C#.

The example environment of use 100 includes an MRTE depicted as a JAVA virtual machine (JVM) 110 in FIG. 1. The example JVM 110 dynamically converts a program represented by machine-independent instructions, or bytecodes 114, into machine-dependent, or native, instructions and then executes the native instructions on one or more processors 120 (such as the processor 1112 discussed below). The JVM 110 may execute the native instructions via an operating system (OS) 130 specific to the one or more processors 120, such as the Microsoft Windows OS, the UNIX OS, the Linux OS, etc.

In the example of FIG. 1, the JVM 110 processes bytecodes 114 that are stored in a plurality of classfiles 114. Typically, a classfile 114 stores bytecodes 114 corresponding to a single JAVA class, including the interfaces, fields and methods that define the class. A classfile 114 may be created by a JAVA compiler 134 from JAVA program source code 138 written, for example, by a software developer. The JAVA compiler 134, the associated JAVA source code 138 and the resulting classfiles 114 (or bytecode 114) are well-known in the art and are not discussed further herein.

To process a classfile 114, the example JVM 110 includes a classloader 142 to locate one or more specific classfiles 114 corresponding to one or more specific classes and to load such classfiles 114 into an execution engine 144 of the JVM 110, for example, by storing a local image of a loaded classfile 114 into a local memory 146. Prior to storing the loaded classfile 114 to memory 146, the classloader 142 may invoke a bytecode verifier 150 to verify that the structure of the loaded classfile 114 is correct and conforms to the constructs of the JAVA language. In either case, the execution engine 144 of the JVM 110 then converts the loaded, machine-independent bytecodes into machine-dependent instructions using, for example, an interpreter 154 and/or one or more Just-In-Time (JIT) compilers 158.

The interpreter 154 converts the bytecode 114 into a set of machine-dependent instructions that implement the functionality of the bytecode 114 on the target processor(s) 120. In other words, the interpreter 154 provides an emulation layer to allow a bytecode 114 to be executed on the target processor(s) 120 as if the processor(s) 120 directly supported the JAVA instruction set. On the other hand, the JIT compiler 158 compiles a set of bytecodes 114 into a set of machine-dependent instructions for execution on the target processor(s) 120. The specific functionality of an individual bytecode 114 may not be exactly translated into machine-dependent instructions, but the overall functionality of the resulting set of machine-dependent instructions will be equivalent to the original set of bytecodes 114. Thus, the JIT compiler 158 may produce more optimal code than the interpreter 154. However, the interpreter 154 may be easier to implement than the JIT compiler 158.

To execute program code provided by the interpreter 154 and/or one or more JIT compilers 158, the execution engine 144 of the JVM 110 may define one or more storage areas in the local memory 146. For example, to support the execution of multiple, simultaneous threads, the JVM 110 may allocate a separate virtual program counter (pc) register and a separate JVM stack frame for each thread in the memory 146. The JVM stack frame may be used to store, for example, local variables and partial results corresponding to the associated execution thread. Additionally, the JVM 110 may define storage areas in the local memory 146 common to all threads. For example, such storage areas may include a heap to store objects that are created during program execution, a method area to store, for example, data and code used to implement the methods for a particular class, and a runtime constant pool to store constants associated with a particular class. To manage the runtime portion of the memory 146 efficiently, the JVM 110 may include a garbage collector 162, for example, to automatically deallocate objects from the heap to free memory for subsequent program execution.

To support the execution of multiple simultaneous threads, the execution engine 144 of the JVM 110 includes a thread support module 166. The thread support module 166 supports the creation of a thread by creating a thread object and executing the thread by invoking a start method of the thread. Additionally, the thread support module 166 may support preferential execution of threads through the use of various priority levels. Of particular interest in this disclosure, the execution engine 144 of the JVM 110 also includes a lock manager 170 to resolve conflicts that may occur as two or more threads attempt to access a same shared object.

The industry-standard specification corresponding to the example JVM 110 (as well as specifications for other managed run-time environments) defines procedures to support synchronization of objects between multiple threads. The JVM 110 provides a synchronization lock for each object. A thread may acquire ownership of an object by acquiring ownership of the lock associated with the object. Similarly, the thread may release ownership of the object by releasing ownership of the lock associated with the object. In the JAVA programming language, synchronization of objects and methods is implemented through the synchronized statement. The specification for the JVM 110 defines the lock acquisition and release operations via the monitorenter and monitorexit bytecodes, respectively. However, the implementation of the monitorenter and monitorexit bytecodes is not defined.

Figure 2:
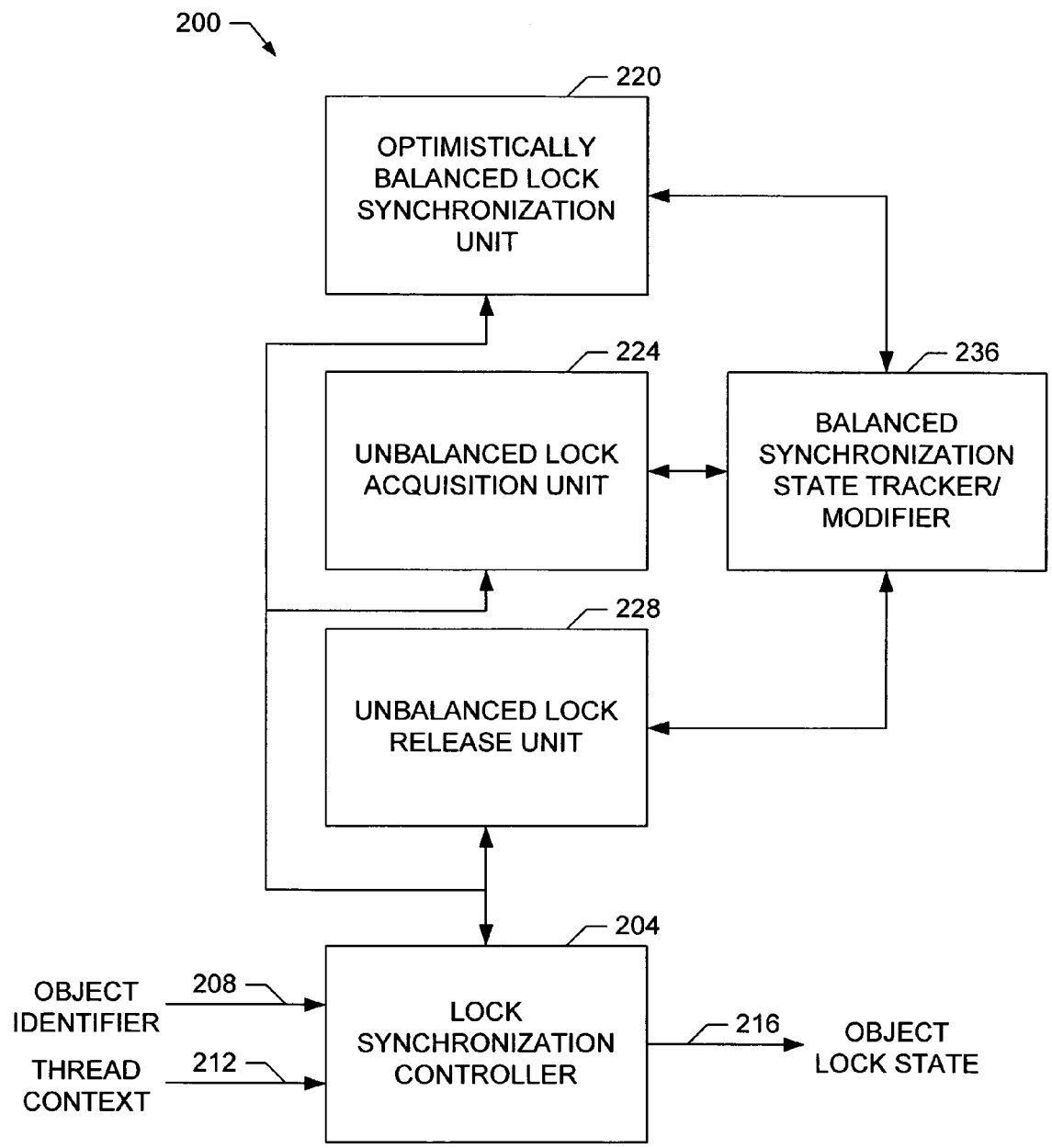
FIG. 2 is a block diagram of an example lock manager that may be used in the managed run-time environment of FIG. 1.

A block diagram of an example lock manager 200 that may be used to implement the example lock manager 170 of FIG. 1 is shown in FIG. 2. The example lock manager 200 acquires and releases a lock of an object for a thread based on a presumption that the majority of lock acquire and lock release will be balanced or optimistically balanced. For example, the lock manager 200 may determine that a set of acquire and release operations on a lock are balanced if such operations occur at the same nesting level and that the critical section of code that lies between the operations contains either no synchronization operations or only other balanced synchronization operations on the lock (e.g., the thread acquires the lock of the object, executes a critical section of program code and then releases the lock of the object). Similarly, the lock manager 200 may determine that a set of acquire and release operations on a lock are optimistically balanced if such operations occur at the same nesting level but the lock manager 200 cannot ascertain with certainty that all the operations are balanced (e.g., in cases in which the critical section of code contains method calls). Most well-formed programs that are written using a higher-level language (e.g., JAVA) and then compiled to bytecodes (e.g., bytecodes 114) exhibit balanced synchronization characteristics (i.e., synchronization that includes a balanced acquire and release pair as mentioned previously). In rare cases, however, a lock acquisition or release may not be balanced (e.g., as may be the case for programs implemented using manually written bytecodes). Accordingly, in addition to the balanced and optimistically balanced lock processing procedures, the lock manager 200 may employ unbalanced acquisition and release procedures to acquire and release the lock of the object, respectively.

As shown in FIG. 2, the lock manager 200 includes a lock synchronization controller 204 that accepts an object identifier input 208 and a thread context input 212 from an executing thread. The object identifier input 208 is used to identify an object to be synchronized and may include a unique object instance identifier, a lockword for the object, etc. The thread context input 212 is used to indicate the identity of a thread seeking to lock or unlock the object identified by the object identifier input 208, the operating state of the thread and the associated operation to perform on the lock of the object (e.g., to acquire the lock or release the lock and whether the acquire and/or release are balanced, optimistically balanced or unbalanced). The lock synchronization controller 204 provides an object lock state output 216 to indicate the state of the lock of the object (e.g., initially acquired, recursively acquired, released/unlocked, throw exception, etc.).

Additionally, the lock synchronization controller 204 invokes a particular lock operation unit based on the type of locking operation to be performed on the lock of the object identified by the object identifier input 208. Example types of locking operations include an optimistically balanced lock synchronization (corresponding to either a balanced synchronization or an optimistically balanced synchronization of an object lock), an unbalanced lock acquisition and an unbalanced lock release. The lock synchronization controller 204 may determine the type of locking operation based on information provided via the thread context input 212. Such information may be determined, for example, by the interpreter 154 and/or JIT compiler 158 of FIG. 1 as part of the conversion from the bytecode 114 to the set of machine-dependent instruction being executed by the thread identified by the thread context input 212.

To perform a balanced lock synchronization of an object (or attempt to perform a balanced synchronization in the case of an optimistically balanced synchronization of the object), the example lock manager 200 includes an optimistically balanced lock synchronization unit 220. If the lock synchronization controller 204 determines that a balanced (or optimistically balanced) synchronization should be performed on the object (e.g., based on the object identifier input 208 and the thread context input 212), then the optimistically balanced lock synchronization unit 220 may determine whether the current shape of the lock associated with the object supports optimistically balanced synchronization. For example, the optimistically balanced synchronization unit 220 may be configured to perform an optimistically balanced synchronization of an object only if the associated object lock is in a thin mode. Conversely, the optimistically balanced synchronization unit 220 may be configured to fall back to a known locking technique (e.g., the technique described by Bacon, et al. discussed above) if the lock is in an inflated mode (e.g., due to previous contention of the object lock, a previous unbalanced locking operation performed on the lock, etc.).

If, for example, a thin lock is associated with the object to be locked, then the optimistically balanced synchronization unit 220 determines whether a thread already has acquired the lock of the object. If the lock of the desired object is available (or already owned by the requesting thread), then the optimistically balanced lock synchronization unit 220 stores the current state of the lock and acquires the lock for the thread. If the lock is not available or, for example, an inflated lock is associated with the object, the optimistically balanced lock synchronization unit 220 invokes a known lock inflation/contention procedure to obtain the lock for the thread after it becomes available. In either case, the optimistically balanced lock synchronization unit 220 may then cause the lock synchronization controller 204 to update the lock state output 216 to indicate that the object lock has been acquired.

After the thread finishes executing code that required the locked object (e.g., as indicated by the thread context input 212), the optimistically balanced lock synchronization unit 220 may be signaled to release the lock of the object by either restoring the lock to its previous state if a thin lock is still associated with object or by executing a known inflated lock release procedure in the case of an inflated lock. After the object lock is released, the optimistically balanced synchronization unit 220 may cause/signal the lock synchronization controller 204 to update the object lock state output 216 accordingly. To support recursive lock acquisitions by a single thread, the optimistically balanced lock synchronization unit 220 includes a synchronization map to track the states of all active optimistically balanced lock acquisitions corresponding to all optimistically balanced synchronizations of a given object. The synchronization map may be used in lieu of a lock recursion counter to track the number of times a thread has acquired a particular object.

To perform an unbalanced lock acquisition or an unbalanced lock release, the lock manager 200 includes an unbalanced lock acquisition unit 224 and an unbalanced lock release unit 228, respectively. If the lock synchronization controller 204 determines that an unbalanced lock acquisition should be performed on the object (e.g., based on the thread context input 212), the unbalanced lock acquisition unit 224 acquires the lock of the object for the thread if the lock is available (or already owned by the thread) or invokes a known lock contention procedure if the lock is unavailable. If the lock synchronization controller 204 determines that an unbalanced release should be performed on the object, then the unbalanced lock release unit 228 releases/unlocks the lock of the object if the lock is currently owned by the thread. If the lock is not owned by the thread, then the unbalanced lock release unit 228 throws an exception indicating that an invalid lock release was attempted. Then, depending on whether a lock acquisition or a lock release was performed, the unbalanced lock acquisition unit 224 or the unbalanced lock release unit 228, respectively, may cause the lock synchronization controller 204 to update the lock state output 216 to indicate the appropriate state of the object lock. Additionally, if a thin lock is currently associated with the object, then the unbalanced lock acquisition unit 224 or the unbalanced lock release unit 228, respectively, may inflate the object lock.

Both the unbalanced lock acquisition unit 224 and the unbalanced lock release unit 228 may need to modify the synchronization map of active optimistically balanced lock acquisition states stored by the optimistically balanced lock synchronization unit 220. For example, an unbalanced lock acquisition or an unbalanced lock release may require that the object lock be inflated from a thin lock to an inflated lock. To perform this lock inflation, the lock recursion counter state variable may be determined based on the entries in the synchronization map. Additionally, a lock shape flag may need to be modified for each pending balanced release in the synchronization map. Thus, to update the synchronization map maintained by the optimistically balanced lock synchronization unit 220, the example lock manager 200 includes a balanced synchronization state tracker/modifier 236. The balanced synchronization state tracker/modifier 236 may be configured to determine the number of active optimistically balanced acquisitions corresponding to a particular object and to modify the lock shape corresponding to a particular active optimistically balanced lock acquisition. The balanced synchronization state tracker/modifier 236 may be invoked by either the unbalanced lock acquisition unit 224 or the unbalanced lock release unit 228 depending on the lock operation being performed (i.e., unbalanced acquisition or unbalanced release, respectively).

Figure 3A:
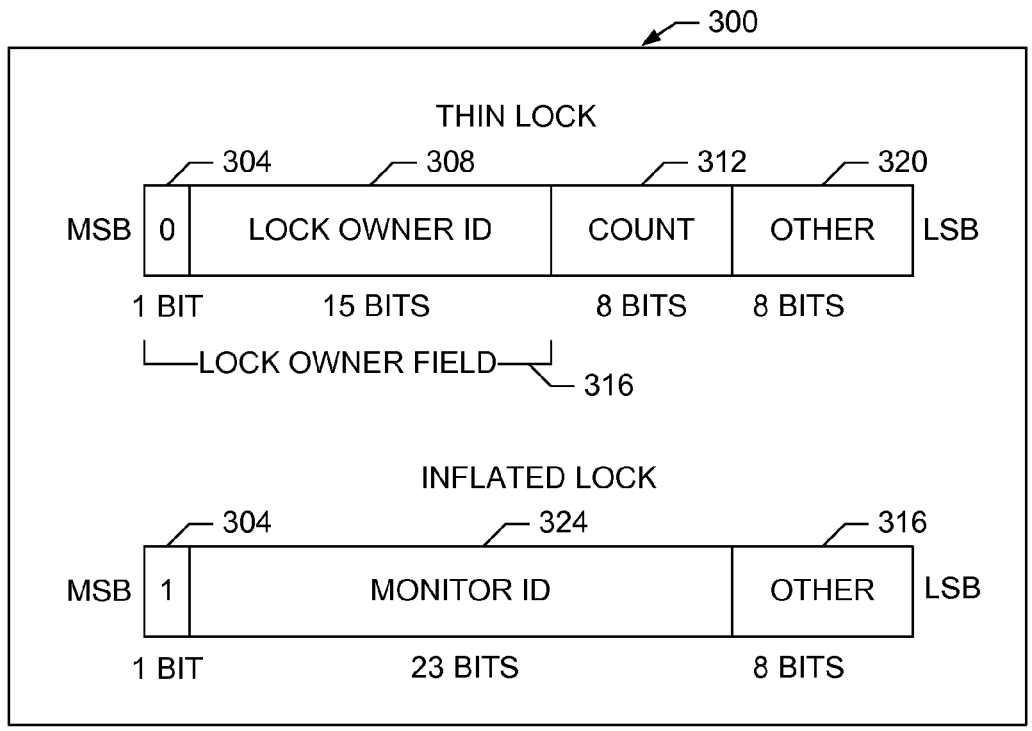
FIG. 3A illustrates example lockwords that may be employed by an example prior-art lock manager for use in the managed run-time environment of FIG. 1.
Figure 3B:
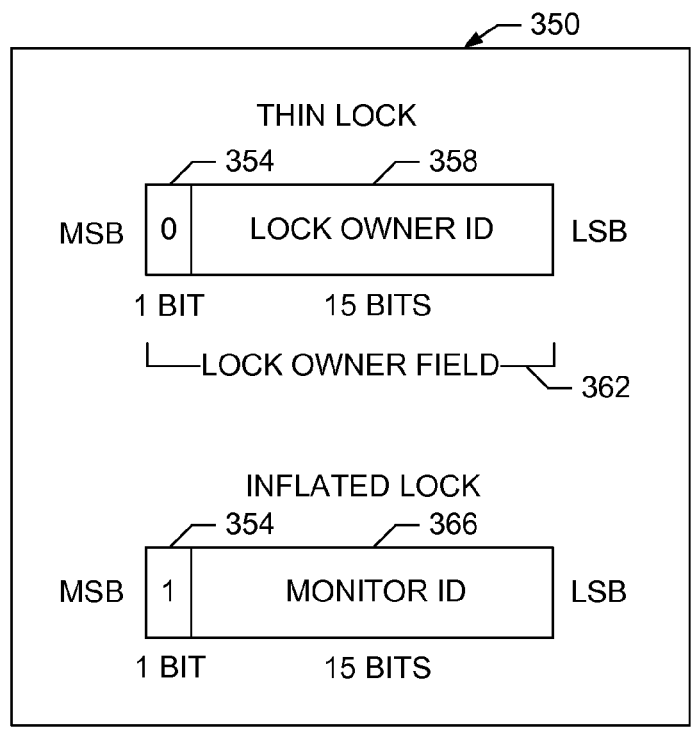
FIG. 3B illustrates example lockwords that may be employed by the example lock manager of FIG. 2.

FIG. 3A illustrates the formats of example lockwords that may be used by a prior-art implementation of the locking manager 170 of FIG. 1. In contrast, FIG. 3B illustrates the formats of example lockwords that may be used by a disclosed implementation of, for example, the locking manager 170 of FIG. 1 and/or the locking manager 200. Turning to FIG. 3A, an example prior-art lockword format that supports thin and inflated locks is shown. The example prior-art lockword format 300 has 32 bits and supports thin and inflated locks. The shape of the lockword (e.g., thin or inflated) is indicated by a 1-bit lock shape 304. For example, a value of 0 may indicate a thin lock and a value or 1 may indicate an inflated lock. For a thin lock (e.g., the lock shape 304 equal to 0), the lockword format 300 includes a 15-bit lock owner identifier (ID) 308 and an 8-bit recursion count 312. Taken together, the lock shape bit 304 and the lock owner ID 308 represent a lock owner field 316. The remaining 8-bit other field 320 may be used, for example, to store other object-related information, such as an object hash code, flags for use by the garbage collector 162, etc.

For an inflated lock (e.g., the lock shape 304 equal to 1), the lockword format 300 includes a 23-bit monitor ID 324. For example, the monitor ID 324 may store an inflated lock cache index that points to a set of data structures corresponding to the object lock and stored in an inflated lock cache. As discussed previously, a prior-art object locking/synchronization technique, such as that described by Bacon, et al., may inflate a thin lock when it becomes too large to fit into the thin lock format. This may occur, for example, when lock contention occurs and a list of threads waiting for the lock needs to be associated with an object (e.g., a single lock owner ID 308 is not sufficient), when the recursion count overflows (e.g., does not fit into the 8-bit recursion count field 312), etc.

Turning to FIG. 3B, an example disclosed lockword format 350 having 16 bits (two-thirds the number of bits as required by the example prior-art lockword format 300 of FIG. 3A) and supporting thin and inflated locks is shown. The shape of the lockword (e.g., thin or inflated) is indicated by a 1-bit lock shape 354. For example, a value of 0 may indicate a thin lock and a value or 1 may indicate an inflated lock. For a thin lock (e.g., the lock shape 354 equal to 0), the lockword format 350 includes a 15-bit lock owner identifier (ID) 358. Taken together, the lock shape bit 354 and the lock owner ID 358 represent a lock owner field 362. In contrast to the example prior-art lockword format 300, the example disclosed lockword format 350 does not include a recursion count because, as discussed previously, the number of lock acquisitions performed on an object may be tracked implicitly through a synchronization map.

For an inflated lock (e.g., the lock shape 354 equal to 1), the lockword format 350 includes a 15-bit monitor ID 366. As for the monitor ID 324 in the example prior-art lockword format 300, the monitor ID 324 may store an inflated lock cache index that points to a set of data structures corresponding to the object lock and stored in an inflated lock cache. As discussed previously in connection with FIG. 2 above, the example disclosed locking techniques (e.g., the example lock manager 200) may inflate a thin lock when an unbalanced locking operation is performed on the lock of the object. For example, an unbalanced lock acquisition or an unbalanced lock release may cause a thin lock to be converted to an inflated lock.

Figure 4A:
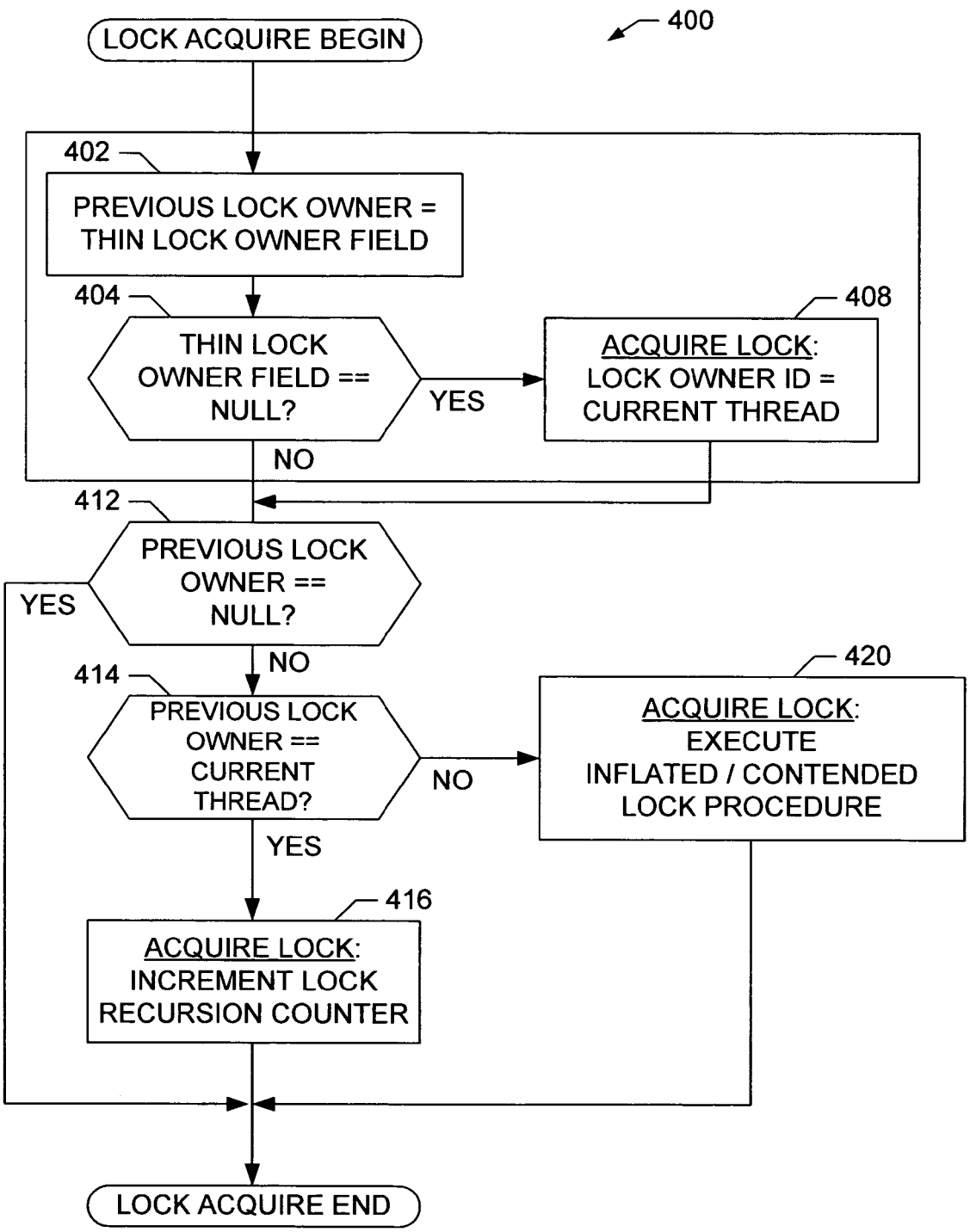
FIGS. 4A-4B are flowcharts representative of example machine readable instructions that may be executed by a machine to implement an example prior-art lock manager that may be used in the managed run-time environment of FIG. 1.
Figure 4B:
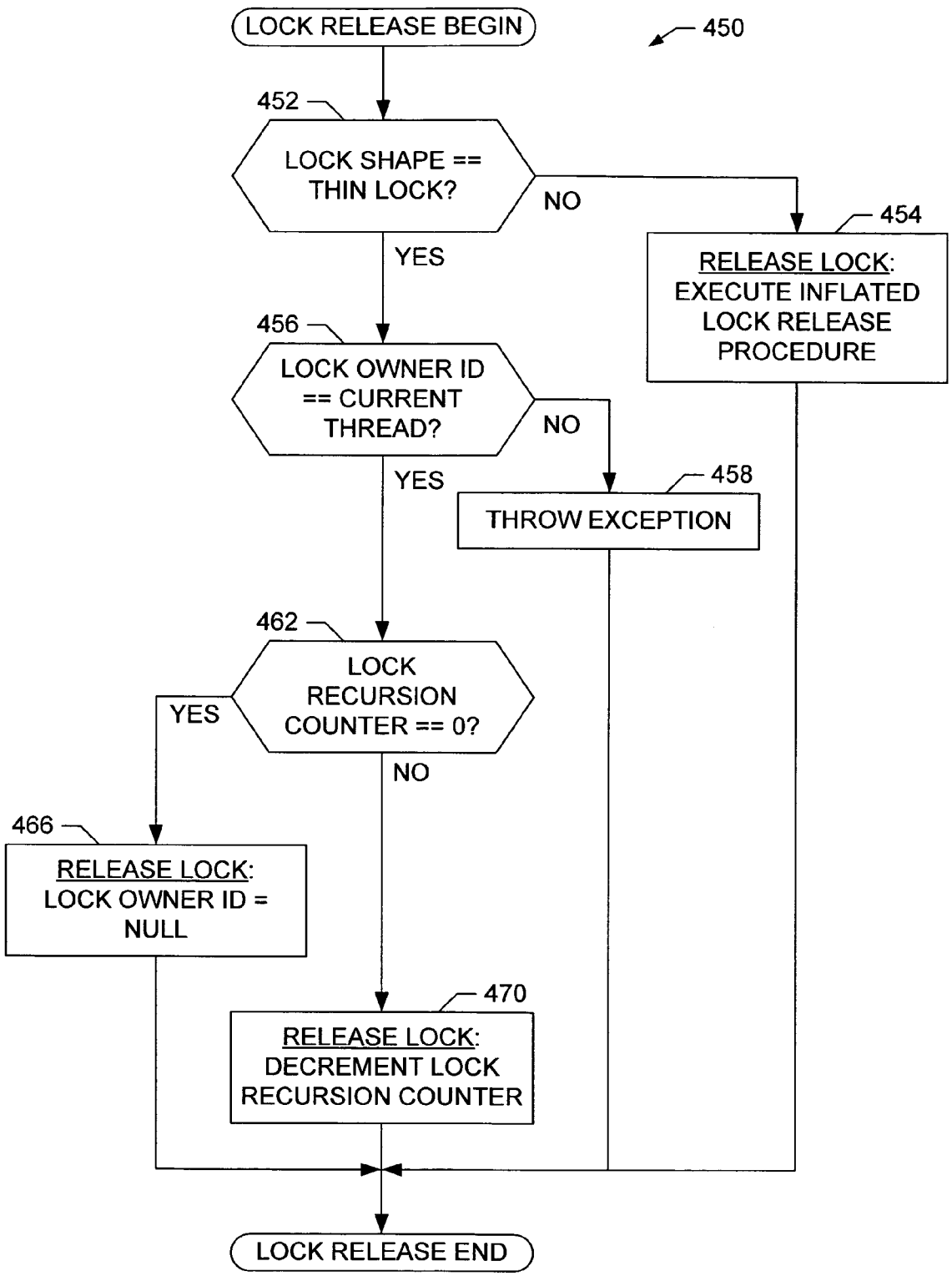

Flowcharts representative of known machine readable instructions for implementing the lock manager 170 of FIG. 1 are shown in FIGS. 4A-4B. Flowcharts representative of example disclosed machine readable instructions for implementing the lock manager 170 of FIG. 1 and/or the lock manager 200 of FIG. 2 are shown in FIGS. 5-9. In the examples of FIGS. 5-9, the processes represented by each flowchart may be implemented by a set of machine readable instructions that may comprise one or more programs for execution by a processor, such as the processor 1112 shown in the example computer 1100 discussed below in connection with FIG. 11. The one or more programs may be embodied in software stored on a tangible medium such as a CD-ROM, a floppy disk, a hard drive, a DVD, or a memory associated with the processor 1112. However, persons of ordinary skill in the art will readily appreciate that the entire program and/or portions thereof could alternatively be executed by a device other than the processor 1112 and/or embodied in firmware or dedicated hardware in a well-known manner. For example, the lock manager 170 and/or the lock manager 200 could be implemented by any combination of software, hardware, and/ or firmware. Further, although the example programs are described with reference to the flowcharts illustrated in FIGS. 5-9, persons of ordinary skill in the art will readily appreciate that many other methods of implementing the example methods and apparatus described herein may alternatively be used. For example, with reference to the flowcharts illustrated in FIGS. 5-9, the order of execution of the blocks may be changed, and/or some of the blocks described may be changed, eliminated, combined and/or subdivided into multiple blocks.

To better appreciate the properties and characteristics of the example lock manager 200 of FIG. 2, and to better understand the operation of the various processes illustrated by the flowcharts of FIGS. 5-9 below, an example prior-art process to implement the lock manager 170 of FIG. 1 is shown in FIGS. 4A-4B. Specifically, FIG. 4A illustrates an example prior-art process 400 to acquire a lock of an object and FIG. 4B illustrates an example prior-art process 450 to release a lock of the object. Although not shown, a controlling process may be used to determine which of the lock acquisition and lock release procedures should be invoked based on the state of an executing program thread.

Turning to FIG. 4A, the example prior-art lock acquisition process 400 begins by setting a variable/register corresponding to the previous lock owner of a lock associated with an object to be locked equal to the present value of a thin lock owner field of a lockword used to represent the lock (such as the thin lock owner field 316 of FIG. 3A) (block 402). The process 400 then attempts to lock the object for a current thread (i.e., the thread requesting the lock) by first determining whether any thread already owns the lock of the object to be locked and/or whether an inflated lock is associated with the object (i.e., whether the thin lock owner field 316 is set to a NULL value) (block 404). If the process 400 determines that no thread owner exists and that a thin lock is associated with the object (i.e., that the thin lock owner field 316 is a NULL value) (block 404) and, thus, that the lock of the object is unlocked, then process 400 acquires the lock for the thread by setting the lock owner ID (such as the lock owner ID 308) to a value representative of the thread (e.g., a unique thread identifier value) (block 408). If, however, the process 400 determines that a lock owner already exists or that an inflated lock is associated with the object (i.e., that the thin lock owner field 316 is not a NULL value) (block 404) then the process 400 leaves the lock owner ID 308 unchanged. To prevent a second thread from attempting to acquire the lock while a first thread is already in the process of becoming the lock owner, blocks 402, 404 and 408 are typically implemented using a single atomic operation (such as a cmpxchg instruction on a processor belonging to the Intel Itanium processor family). An atomic operation provides a thread (and/or a processor in a multi-processor system) with exclusive access to shared memory during the execution of the atomic operation. Thus, no other thread can modify the memory locations accessed by the atomic operation during its execution.

After it is determined that either the thin lock owner field 316 is not NULL (block 404) or the lock owner ID 308 is defined to be the current thread (block 408), the process 400 determines whether the previous lock owner of the object is a NULL value (corresponding to the case in which the current thread has acquired the lock at block 408) (block 412). If the previous lock owner is a NULL value (block 412), then the example process 400 ends. If, however, the process 400 determines that the previous lock owner is not a NULL value (block 412), then the process determines whether the previous lock owner is the current thread (corresponding to the case in which the current thread has already previously acquired the thin lock of the object) (block 414). If the previous lock owner is the current thread (block 414), then the process 400 may, for example, increment a lock recursion counter associated with the lock to indicate that the current thread has acquired the thin lock of the object multiple times (block 416). The example process 400 then ends.

If, however, the process 400 determines that the previous lock owner is not the current thread (block 414) and, thus, that either another thread already owns the thin lock of the object or that an inflated lock is associated with the object, then the process 400 invokes a known lock inflation/contention procedure to allow the current thread to acquire the inflated lock of the object after the present lock owner (if any) releases the lock (block 420). For example, the process 400 may cause the current thread to spin in an execution loop or halt execution until the present lock owner if any) releases/unlocks the lock of the object. After the lock of the object becomes available, the process 400 may then inflate and acquire the lock for the current thread and the example process 400 then ends.

Turning to FIG. 4B, the example prior-art lock release process 450 begins by attempting to release an object for the current thread (i.e., the thread requesting the release) by first determining the shape of the lock associated with the object (block 452). If an inflated lock is associated with the object (e.g., based on the lock shape bit 304 of FIG. 3A), then the process 450 invokes a known inflated lock release procedure to release the inflated lock of the object (block 454). The example process 450 then ends. However, if a thin lock is associated with the object (block 452), then the process 450 determines whether the lock owner ID of the thin lock associated with the object (such as the lock owner ID 308) corresponds to the current thread (block 456). If the lock owner ID 308 is not the current thread and, thus, another thread presently owns the lock (block 456), then the process 450 throws an exception (block 458). At block 458, the process 450 may use any known exception handling technique to throw an exception indicating that an invalid release attempt was performed (because a thread that did not own the lock attempted to unlock the associated object). The example process 450 then ends.

If, however, the lock owner ID 308 is the current thread (block 456), then the process 450 determines whether a lock recursion counter (such as the recursion count 312) associated with the lock is equal to zero (or, equivalently, indicates that the lock has only one acquire currently active) (block 462). If the lock recursion count 312 equals zero (block 462), the process 450 unlocks the lock of the object, for example, by setting the lock owner ID 308 to a NULL value (block 466). If, however, the lock recursion count 312 is not equal to zero (block 462), the process 450 decrements the lock recursion count 312 (e.g., to indicate that the present lock release countered an active lock acquire) (block 470). After processing at blocks 466 or 470 completes, the example process 450 then ends.

Figure 5:
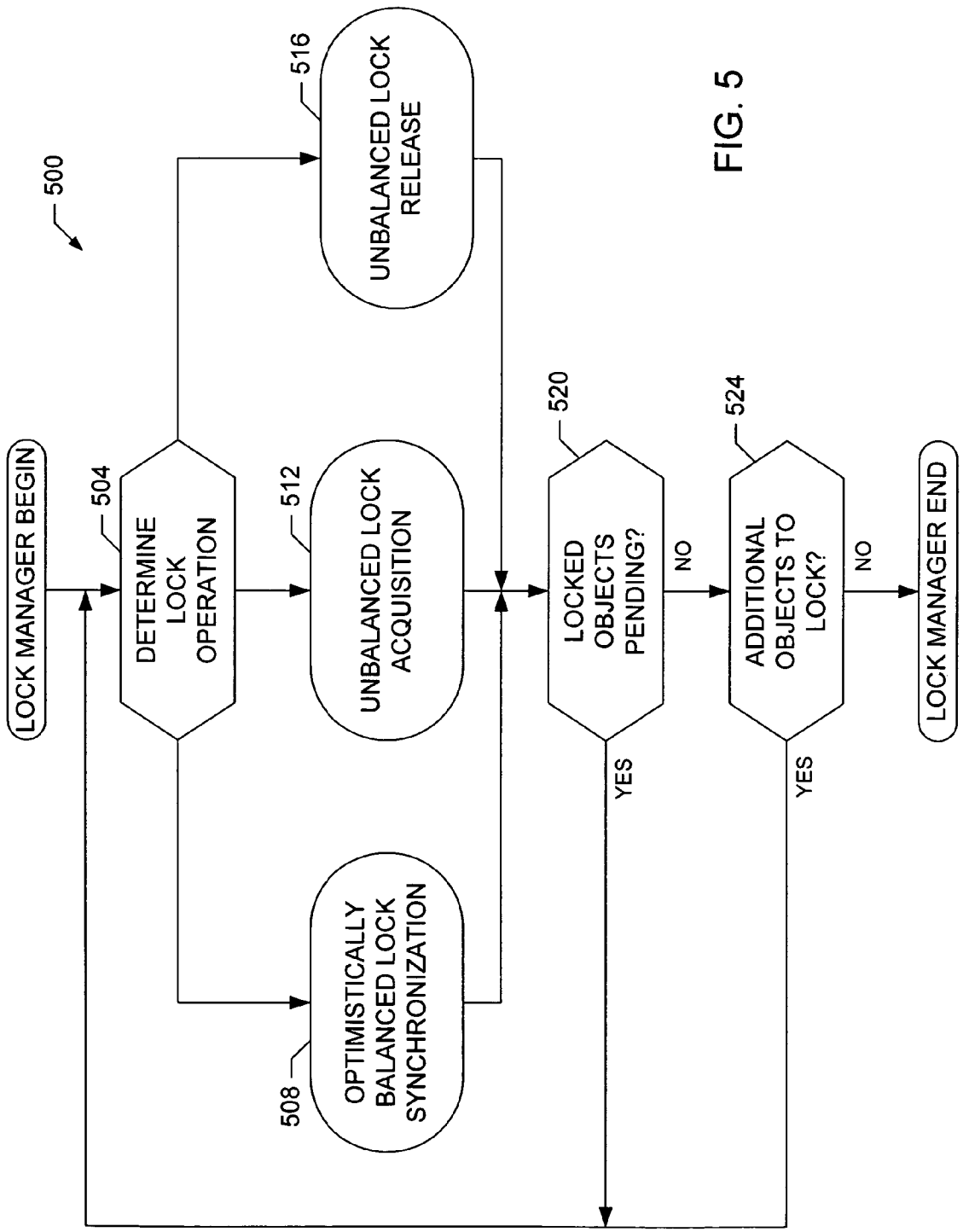
FIG. 5 is a flowchart representative of example machine readable instructions that may be executed by a machine to implement the example lock manager of FIG. 2.

Based on the understanding provided by the example prior-art processes 400 and 450 of FIGS. 4A-4B, an example lock manager process 500 that may be used to implement the example lock manager 200 of FIG. 2 is illustrated in FIG. 5. The example lock manager process 500 may be invoked, for example, during various execution stages of one or more threads when such threads operate on a synchronized object.

For example, the example process 500 may be invoked to acquire or release a lock of an object.

The example lock manager process 500 begins by determining which type of locking operation to perform for the current thread on the lock of the object (block 504). Valid locking operations may include an optimistically balanced lock synchronization (comprising an optimistically balanced lock acquisition and release pair), an unbalanced lock acquisition and an unbalanced lock release. For example, a JIT compiler, such as the JIT compiler 158 of FIG. 1, may use control flow graphs and/or data flow analyses to determine the types of locking operations to perform on the lock of an object at the appropriate points during program execution. The JIT compiler 158 may then output compiled code that may be used by the lock manager 200 or lock manager process 500 to make the appropriate lock operation determination at block 504. Any known technique for determining whether a locking operation is balanced (or at least optimistically balanced) or unbalanced may be employed by the example process 500 and, thus, such techniques are not discussed further herein.

Based on the locking procedure determination made at block 504, control then proceeds to one of blocks 508, 512 and 516. At block 508, the lock manager 200 performs an optimistically balanced synchronization operation on the lock of the object. At block 512, the lock manager 200 performs an unbalanced lock acquisition operation on the lock of the object. At block 516, the lock manager 200 performs an unbalanced lock release operation on the lock of the object. The processing performed at blocks 508, 512 and 516 is discussed in greater detail through the descriptions of FIGS. 6, 7 and 8, respectively, provided below.

After the processing at blocks 508, 512 or 516 completes, the process 500 determines whether at least one locked object is still pending that will require a subsequent release at a future thread execution point (block 520). If any locked objects are pending (block 520), then control returns to block 504 and blocks subsequent thereto to allow the locks of such objects to be processed (as well as the locks of any additional objects to be locked). If, however, no locked objects are pending (block 520), the process 500 determines whether there are any additional objects to lock (block 524). If there are additional objects to lock (block 524), then control returns to block 504 and blocks subsequent thereto to allow the locks of such objects to be processed. If, however, there are no additional objects to lock (block 524), then the example process 500 ends. One having ordinary skill in the art will recognize that the conditional operations performed at blocks 520 and/or 524 may be replaced, for example, by an explicit or implicit determination regarding whether the program (or any thread of the program) is still executing. If the process 500 is still executing, control could then return to block 504 and subsequent blocks 508, 512 and 516. Such a cycle could repeat until the process 500 (or all thread execution) terminates.

Figure 6:
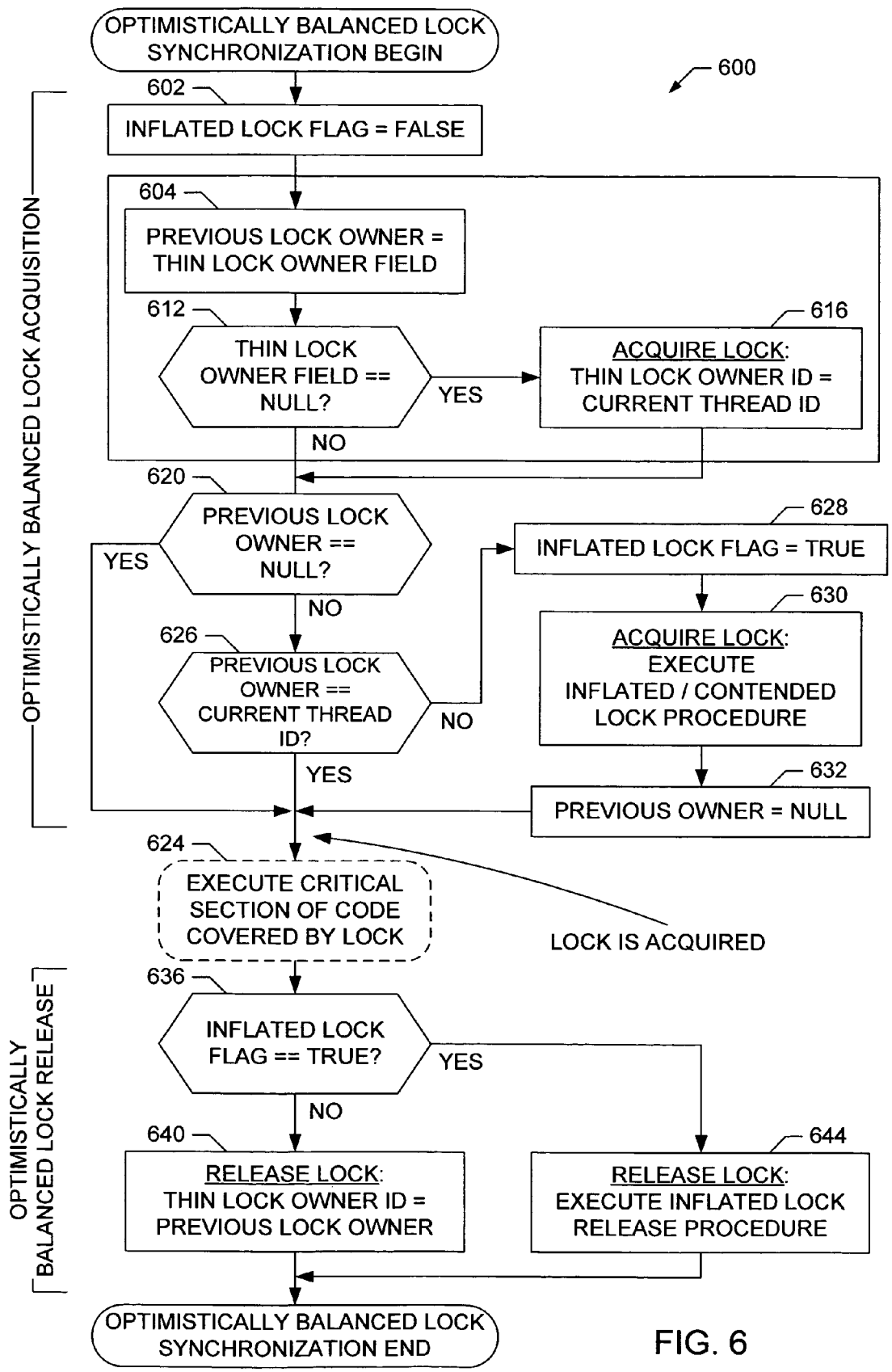
FIG. 6 is a flowchart representative of example machine readable instructions that may be executed by a machine to implement the example optimistically balanced lock synchronization unit of FIG. 2.

An example optimistically balanced lock synchronization process 600 that may be used to perform the processing at block 508 of FIG. 5 and/or implement the optimistically balanced lock synchronization unit 220 of FIG. 2 is shown in FIG. 6. The example optimistically balanced lock synchronization process 600 begins by initializing an inflated lock flag to FALSE (block 602). The inflated lock flag is used to indicate the current shape of the lock associated with the lock (e.g., thin or inflated). Next, the process 600 sets a variable/register corresponding to the previous lock owner of the lock equal to the present value of the thin lock owner field associated with lock of the object (such as the thin lock owner field 362 of FIG. 3B) (block 604). The process 600 then determines whether a thread already owns the lock of the object to be locked and/or whether an inflated lock is associated with the object (i.e., whether a lock owner exists for the object or whether the lock owner is set to a NULL value) (block 612). If no thread owner exists and a thin lock is associated with the object (i.e., the thin lock owner field 362 is a NULL value) (block 612) and, thus, the lock of the object is unlocked, then the process 600 acquires the thin lock of the object for the thread by setting a thin lock owner ID of the lock (e.g., the thin lock owner ID 358) to a value representative of the thread (e.g., a unique thread identifier value) (block 616). If, however, the process 600 determines that a lock owner already exists and/or an inflated lock is associated with the object (i.e., the thin lock owner field 362 is not a NULL value) (block 612), the process 600 leaves the thin lock owner ID 358 unchanged.

To prevent a second thread from attempting to acquire the lock while a first thread is already in the process of becoming the lock owner, blocks 604, 612 and 616 are typically implemented using a single atomic operation (such as a cmpxchg instruction on a processor belonging to the Intel Itanium processor family). As discussed above, an atomic operation provides a thread (and/or a processor in a multi-processor system) with exclusive access to shared memory during the execution of the atomic operation. Thus, no other thread can modify the memory locations accessed by the atomic operation during its execution. For example, the processing performed at blocks 604, 612 and 616 may be implemented on a processor belonging to the Intel Itanium processor family based on the following instruction sequence:

ar.ccv=mov 0 r1=cmpxch2.acq [r3], r2

In the preceding instructions, the register r1 may be used to represent the previous lock owner, the register r2 may be used to represent the current thread, and the register r3 may hold an address corresponding to the present thin lock owner field 362. The first instruction (ar.ccv=mov 0) sets the ar.ccv register to zero (i.e., a NULL value). The second instruction (r1=cmpxchg2.acq [r3], r2) is an atomic instruction that may be used to: 1) set the previous lock owner equal to the present thin lock owner field 362 (i.e., r1=[r3]); 2) check whether the present thin lock owner field 362 is a NULL value (i.e., whether [r3] equals ar.ccv); 3) if the present thin lock owner field 362 is a NULL value (i.e., if [r3] equals ar.ccv), set the thin lock owner ID 358 to a value representative of the current thread (i.e., [r3]=r2); and 4) if the present thin lock owner field 362 is not a NULL value (i.e., if [r3] does not equal ar.ccv), then leave the thin lock owner ID 358 unchanged (i.e., leave [r3] unchanged).

Returning to FIG. 6, after it is determined that either the thin lock owner field 362 is not NULL (block 612) or the thin lock owner ID 358 is set to be the current thread (block 616), the process 600 determines whether the previous lock owner of the object is a NULL value (corresponding to the case in which the current thread has acquired the thin lock at block 616) (block 620). If the previous lock owner is a NULL value (block 620), then control proceeds to block 624. If, however, the process 600 determines that the previous lock owner is not a NULL value (block 620), then the process determines whether the previous lock owner is the current thread (corresponding to the case in which the current thread has already previously acquired the thin lock of the object) (block 626). If the previous lock owner is the current thread (block 626), then control proceeds to block 624. If, however, the process 600 determines that the previous lock owner is not the current thread (block 626) and, thus, that either another thread already owns the lock or an inflated lock is associated with the object, the process 600 then sets the inflated lock flag to TRUE to indicate that an inflated lock is or will be associated with the object (block 628). The process 600 then invokes a known lock inflation/contention procedure to allow the current thread to acquire the inflated lock of the object after the present lock owner (if any) releases the lock (block 630). The process 600 may cause the current thread to spin in an execution loop or halt execution until the present lock owner (if any) releases/unlocks the lock of the object. After the lock of the object becomes available, the process 600 may then acquire the inflated lock for the current thread. Additionally, the process 600 may reset the previous lock owner to a NULL value as there will be no previous lock owner after the lock inflation/contention procedure of block 630 completes (block 632). Control then proceeds to block 624.

At block 624, the current thread executes the critical section of code corresponding to the object that was locked. After the execution of this critical section of code completes, the process 600 determines whether an inflated lock is associated with the object (e.g., whether the inflated lock flag is TRUE) (block 636). If a thin lock is associated with the object (i.e., the inflated lock flag is FALSE), the process 600 resets the thin lock owner ID 358 of the lock to be the previous lock owner (block 640). By resetting the thin lock owner ID 358 equal to previous lock owner, the process 600 either unlocks the lock if the previous owner was a NULL value or maintains the lock for the current thread if the previous lock owner is the current thread. If, however, an inflated lock is associated with the object (i.e., the inflated lock flag is TRUE), then the process 600 invokes a known inflated lock release procedure to release the inflated lock of the object (block 644). After processing at blocks 640 or 644 completes, the example process 600 then ends.

To support recursive optimistically balanced lock synchronization (and also the unbalanced lock acquisition and release procedures discussed below), the lock manager 200 and/or the lock manager process 500 utilizes one or more synchronization maps to store/track the states of any or all active optimistically balanced acquisition operations for each instance of a method (e.g., JAVA method) that invokes an optimistically balanced lock synchronization. An example synchronization map entry to represent the state of an active optimistically balanced acquisition operation includes a lock address, a previous lock owner value and an inflated lock flag. Each entry of the synchronization map may be stored in the call stack within the call frame corresponding to the particular instance of the method that invoked the optimistically balanced lock synchronization (thereby supporting recursive lock acquisition caused by nested calls to the same method). As is discussed in greater detail below, the unbalanced lock acquisition and release operations may traverse the synchronization map to determine the number of optimistically balanced acquisition operations that are active on the call stack and modify such operations as needed.

Figure 7:
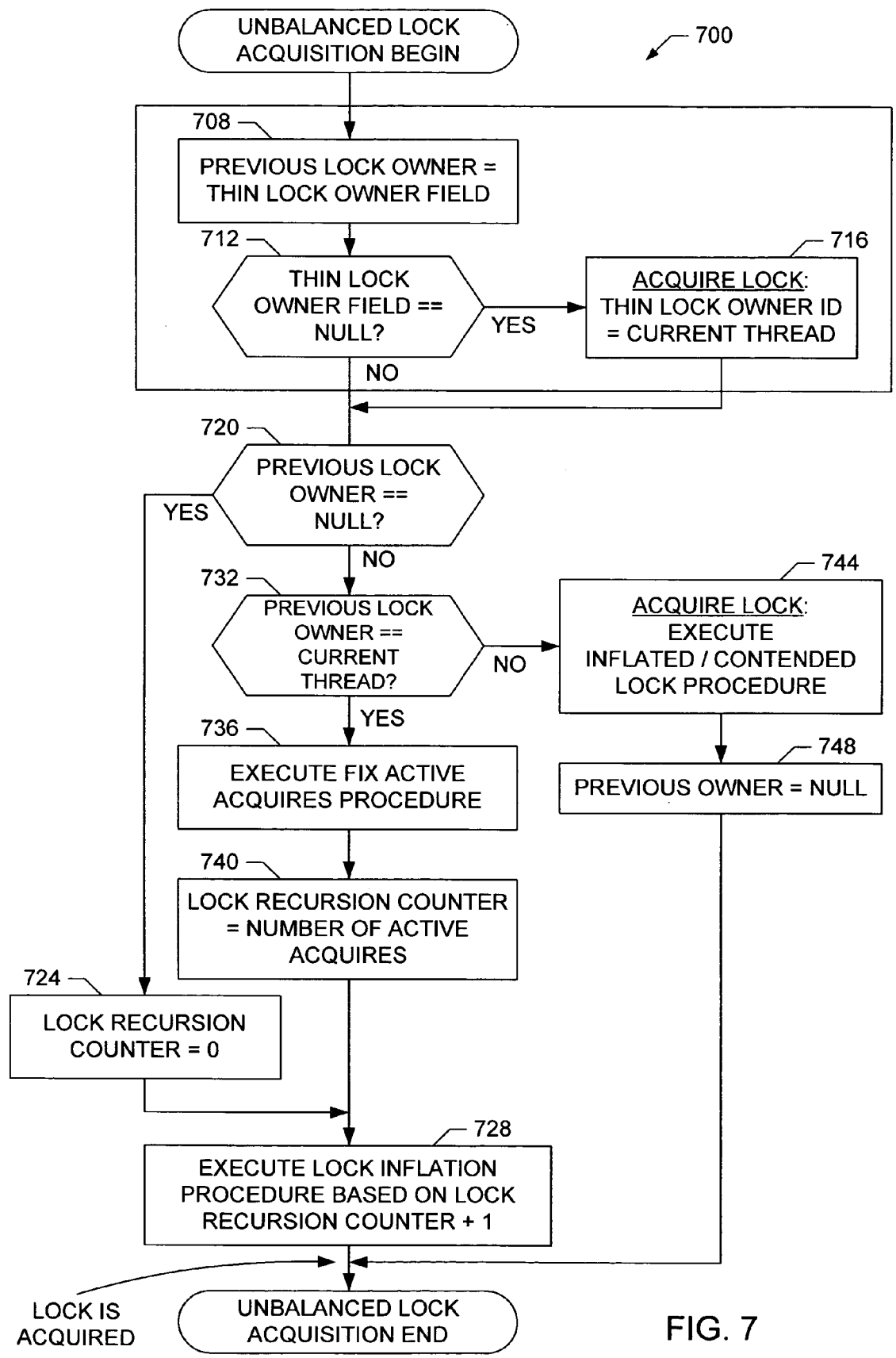
FIG. 7 is a flowchart representative of example machine readable instructions that may be executed by a machine to implement the example unbalanced lock acquisition unit of FIG. 2.

An example unbalanced lock acquisition process 700 that may be used to perform the processing at block 512 of FIG. 5 and/or implement the unbalanced lock acquisition unit 224 of FIG. 2 is shown in FIG. 7. The example unbalanced lock acquisition process 700 begins by setting a variable/register corresponding to the previous lock owner of the lock equal to a present thin lock owner field associated with the object lock (such as the thin lock owner field 362 of FIG. 3B) (block 708). The process 700 then determines whether a thread already owns the lock of the object to be locked and/or whether an inflated lock is associated with the object (i.e., whether the thin lock owner field 362 is set to a NULL value) (block 712). If no thread owner exists and a thin lock is associated with the object (i.e., the thin lock owner field 362 is set to a NULL value) (block 712) and, thus, the lock of the object is unlocked, then the process 700 acquires the thin lock of the object for the thread by setting a thin lock owner ID of the lock (e.g., the thin lock owner ID 358) to a value representative of the thread (e.g., a unique thread identifier value) (block 716). If, however, the process 700 determines that a lock owner already exists and/or an inflated lock is associated with the object (i.e., the thin lock owner field 362 is not set to a NULL value) (block 712), the process 700 leaves the thin lock owner ID 358 unchanged.

As discussed previously, to prevent a second thread from attempting to acquire the lock while a first thread is already in the process of becoming the lock owner, blocks 708, 712 and 716 are typically implemented using a single atomic operation (such as a cmpxchg instruction on a processor belonging to the Intel processor family). An atomic operation provides a thread (and/or a processor in a multi-processor system) with exclusive access to shared memory during the execution of the atomic operation. Thus, no other thread can modify the memory locations accessed by the atomic operation during its execution.

Returning to FIG. 7, after it is determined that either the thin lock owner field 362 is not NULL (block 712) or the thin lock owner ID 358 is defined to be the current thread (block 716), the process 700 determines whether the previous lock owner of the object is a NULL value (corresponding to the case in which the current thread has acquired the thin lock at block 716) (block 720). If the previous lock owner is a NULL value (block 720), then the process 700 sets a lock recursion counter equal to zero in preparation for inflating the lock of the object (block 724). The lock recursion counter is set to zero to indicate that the first lock acquisition of the object is being performed. The process 700 then invokes a known lock inflation procedure based on a number of recursive lock acquisitions of the object lock equal to one more than the value of the lock recursion counter (block 728) For this case, the lock recursion counter is zero and, thus, the lock inflation procedure is based on one acquisition of the lock. The example process 700 then ends.

Figure 9:
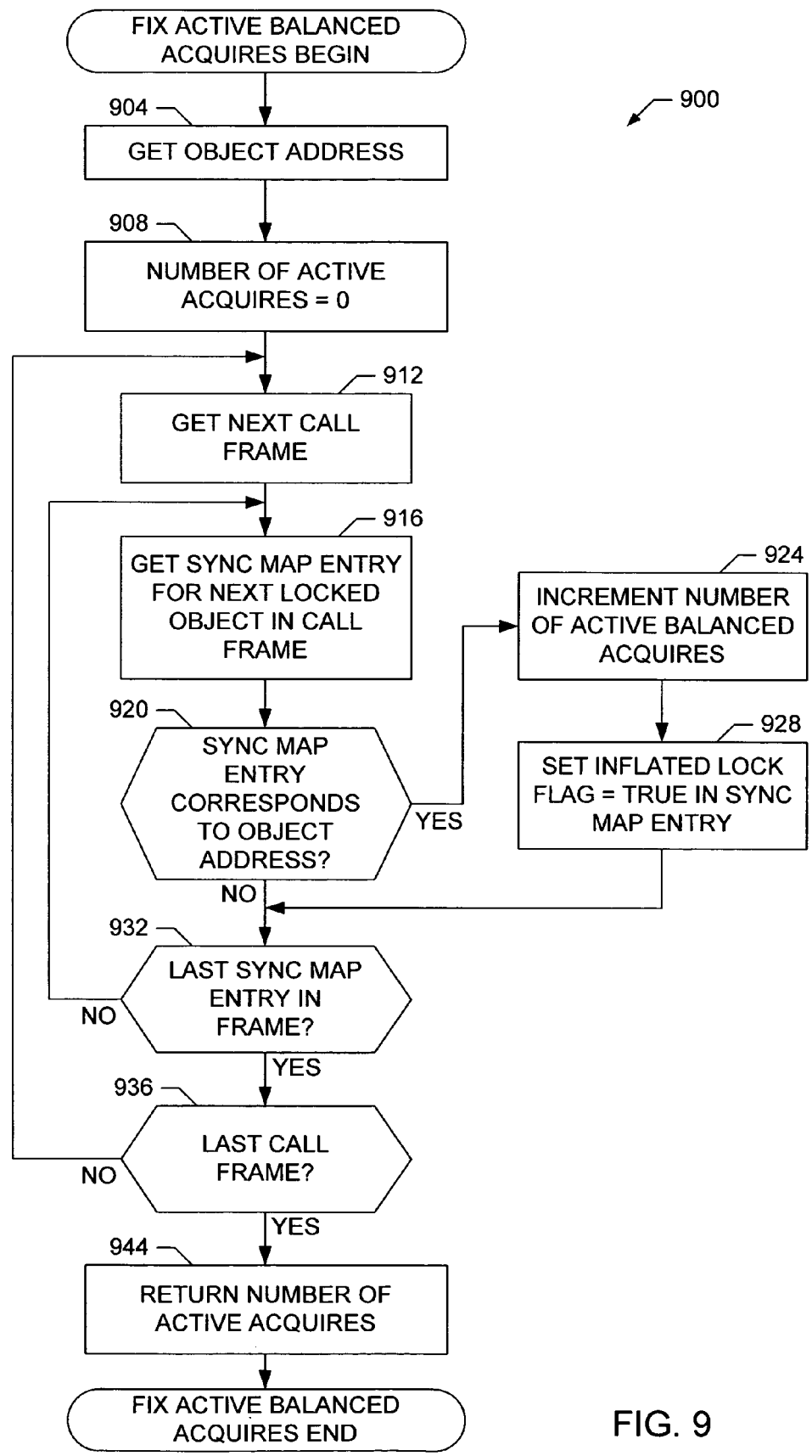
FIG. 9 is a flowchart representative of example machine readable instructions that may be executed by a machine to modify the state of pending balanced releases for use by the processes of FIGS. 6 and 7.

If, however, the process 700 determines that the previous lock owner is not a NULL value (block 720), then the process determines whether the previous lock owner is the current thread (corresponding to the case in which the current thread has already previously acquired the thin lock of the object) (block 732). If the previous lock owner is the current thread (block 732), then in preparation for inflating the lock of the object, the process 700 invokes a procedure to fix the states of the active optimistically balanced acquisition operations stored in the synchronization map corresponding to the object to be locked (block 736). This fix active acquires procedure may process the synchronization map to determine the number of recursive optimistically balanced lock acquisitions corresponding to the object and change the corresponding inflated lock flags to TRUE to indicate that an inflated lock will be associated with the object (due to the unbalanced lock acquisition being performed by the process 700). An example procedure for implementing the processing performed at block 736 is shown in FIG. 9 and is discussed in greater detail below.

After the fix active acquires procedure completes (block 736), the process 700 sets the lock recursion counter corresponding to the lock of the object equal to the number of active optimistically balanced lock acquisitions determined by the fix active acquires procedure (block 740). The process

700 then invokes a known lock inflation procedure based on a number of recursive lock acquisitions of the object lock equal to one more than the value of the lock recursion counter (block 728). For this case, the lock inflation procedure is based on the number of active optimistically balanced lock acquisitions plus one unbalanced lock acquisition (which corresponds to one more than the value of the lock recursion counter determined at block 740). The example process 700 then ends.

If, however, the process 700 determines that the previous lock owner is not the current thread (block 732) and, thus, that either another thread already owns the lock or an inflated lock is already associated with the object, the process 700 invokes a known lock inflation/contention procedure to allow the current thread to acquire an inflated lock of the object after the present lock owner (if any) releases the lock (block 744). The process 700 may cause the current thread to spin in an execution loop or halt execution until the present lock owner (if any) releases/unlocks the lock of the object. After the lock of the object becomes available, the process 700 may then acquire the inflated lock for the current thread. Additionally, the process 700 may reset the previous lock owner to a NULL value as there will be no previous lock owner after the lock contention procedure of block 744 completes (block 748). The example process 700 then ends.

Figure 8:
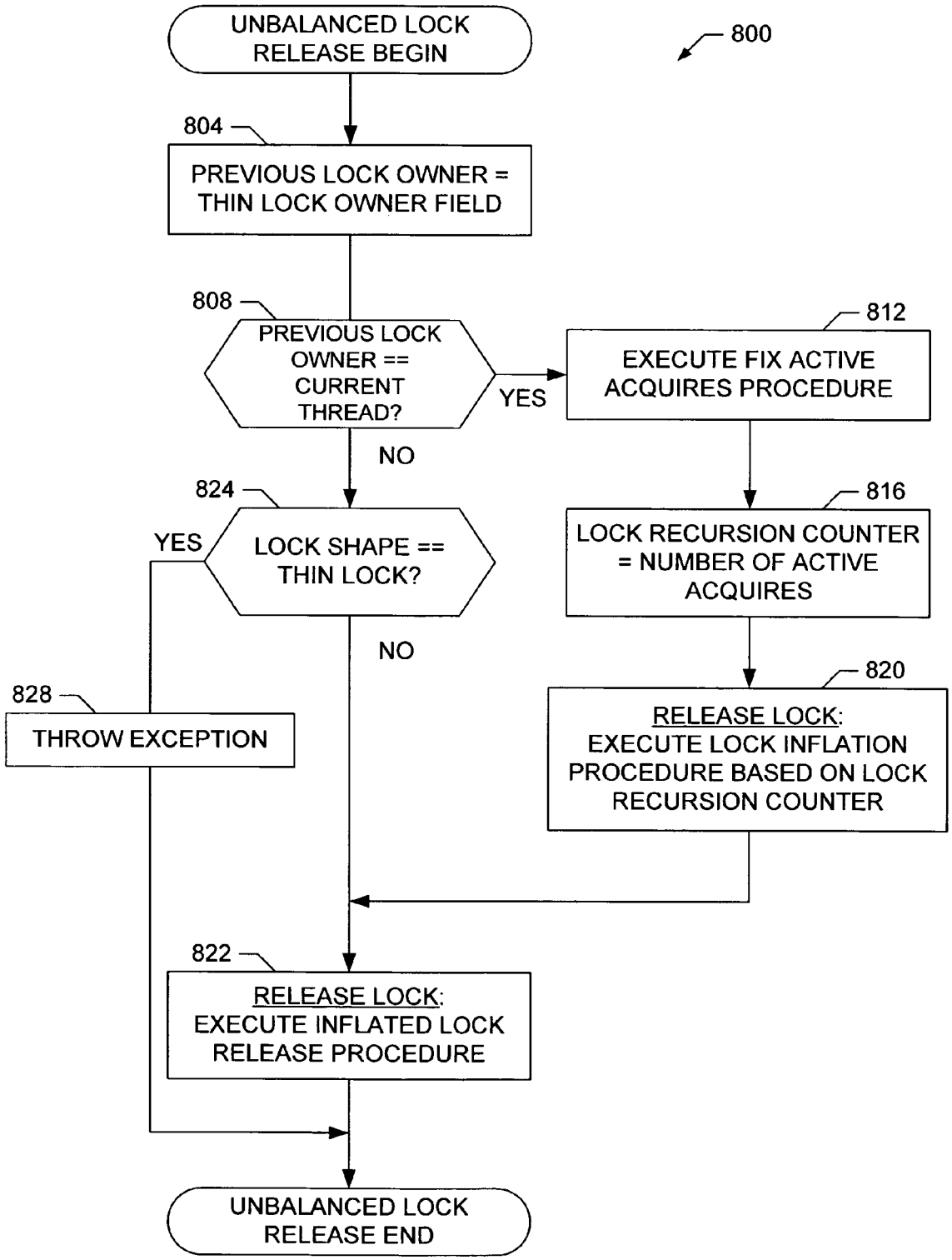
FIG. 8 is a flowchart representative of example machine readable instructions that may be executed by a machine to implement the example unbalanced lock release unit of FIG. 2.

An example unbalanced lock release process 800 that may be used to perform the processing at block 516 of FIG. 5 and/or implement the unbalanced lock release unit 228 of FIG. 2 is shown in FIG. 8. The example unbalanced lock release process 800 begins by setting a variable/register corresponding to the previous lock owner of the lock equal to a present thin lock owner field associated with the object lock (such as the thin lock owner field 362 of FIG. 3B) (block 804). The example process 800 then determines whether the previous lock owner corresponds to the current thread attempting to release the object lock (block 808). If the previous lock owner corresponds to the current thread (block 808) and, thus, the current thread owns the thin lock of the object, then in preparation for inflating the lock of the object, the process 800 invokes a procedure to fix the states of the active optimistically balanced acquisition operations stored in the synchronization map corresponding to the object to be locked (block 812). This fix active acquires procedure may process the synchronization map to determine the number of recursive optimistically balanced lock acquisition corresponding to the object and change the corresponding inflated lock flags to TRUE to indicate that an inflated lock will be associated with the object (due to the unbalanced lock release being performed by the process 800). An example procedure for implementing the processing performed at block 812 is shown in FIG. 9 and is discussed in greater detail below.

After the fix active acquires procedure completes (block 812), the process 800 sets a lock recursion counter corresponding to the lock of the object equal to the number of active optimistically balanced lock acquisitions determined by the fix active acquires procedure to be stored in the synchronization map (block 816). The process 800 then invokes a known lock inflation procedure based on a number of recursive lock acquisition of the object lock equal to the value of the lock recursion counter determined at block 816 (block 820). After the lock inflation procedure completes (block 820), the process 800 invokes a known inflated lock release procedure to release the inflated lock of the object (block 822). The example process 800 then ends.

If, however, the previous lock owner does not correspond to the current thread attempting to release the lock (block 808), the process 800 then determines whether a thin lock is associated with the object (block 824). For example, the process 800 may make this determination based on a lock shape bit, such as the lock shape bit 354 of FIG. 3B, associated with the thin lock of the object. If a thin lock is associated with the object (block 824) and, thus, a thread that does not own the think lock is attempting to the release the object lock (based on the determination made at block 808), the process 800 uses a known exception handling technique to throw an exception to indicate the current thread improperly attempted to release a lock that it did not own (block 828). If, however, a thin lock is not associated with the object (block 824) and, thus, an inflated lock is associated with the object, the process 800 then invokes a known inflated lock release procedure to release the inflated lock of the object (block 822). After processing at either block 822 or block 828 completes, the example process 800 then ends.

An example process 900 to modify the state of an active optimistically balanced acquisition in a synchronization map (e.g., the synchronization map maintained by the optimistically balanced lock synchronization process 600 of FIG. 6 or the optimistically balanced lock synchronization unit 220 of FIG. 2) is shown in FIG. 9. The example process 900 may be used to fix the lock shape flags associated with a set of active optimistically balanced lock acquisitions in preparation for inflating the lock associated with a particular object. The example process 900 may be used by, for example, the example unbalanced lock acquisition process 700 and/or the unbalanced lock release process 800 of FIGS. 7 and 8, respectively. Specifically, the example process 900 may be invoked by the example processes 700 and/or 800 to implement the processing performed by block 736 of FIG. 7 and/or block 812 of FIG. 8. The example process 900 may also be used to implement the balanced release tracker/modifier 236 of FIG. 2.

Turning to FIG. 9, the example process 900 begins by obtaining the lock corresponding to the object being processed, for example, by obtaining the address of the lockword associated with the object (block 904). The process 900 then initializes a counter corresponding to the number of active optimistically balanced acquisitions to zero (block 908). After this initialization completes, the process 900 begins iterating through each call frame in the call stack to determine the presence of active optimistically balanced acquisitions corresponding to the object lock selected at block 904.

The process 900 begins iterating through the call frame of the call stack by obtaining the next call frame on the call stack (block 912). The process 900 then obtains the synchronization map entry for the next locked object stored in the call frame being processed (block 916). Next, the process 900 determines whether the synchronization map entry corresponds to the object lock being processed (block 920). If the synchronization map entry does correspond to the object lock being processed (block 920), the process 900 increments a counter corresponding to the number of active optimistically balanced acquisitions of the object lock (block 924). The process 900 also sets the inflated lock flag in the synchronization map entry to TRUE to indicate that an inflated lock will be associated with the object (block 928).

After the processing at block 928 completes, or if the synchronization map entry does not correspond to the object lock being processed (block 920), the process 900 determines whether the synchronization map entry being processed is the last synchronization map entry in call frame being processed (block 932). If the synchronization map entry is not the last synchronization map entry (block 932), control then returns to block 916 at which the process 900 obtains the synchronization map entry for the next locked object stored in the call frame being processed. If, however, the synchronization map entry is the last synchronization map entry (block 932), the process 900 determines whether the call frame being processed is the last call frame in the call stack (and thus whether the end of the synchronization map has been reached) (block 936). If the call frame is not the last call frame (block 936), then control returns to block 912 at which the process 900 gets the next call frame to process. If, however, the call frame being processed is the last call frame in the call stack (block 936), the process 900 returns the number of active optimistically balanced acquisitions corresponding to the locked object being processed (block 944). The example process 900 then ends.

To assist in understanding the methods, apparatus and articles of manufacture described herein, an example operation of the example lock manager of FIG. 2 and/or the example processes 500, 600, 700, 800 and 900 of FIGS. 5, 6, 7, 8 and 9, respectively, is shown in FIGS. 10A-10C. The example operation of FIGS. 10A-10C corresponds to a sequence of lock acquisitions and releases performed by a single thread on the locks of two objects. The locking sequence results from various methods A through C being invoked that require that the object be locked for method execution. FIG. 10A illustrates the example program sequence. FIG. 10B illustrates the entries of an example synchronization map for two points in the program sequence. FIG. 10C illustrates the states of the inflated lock flags associated with each synchronization map entry before and after the unbalanced lock release of FIG. 10A is performed.

Turning to FIG. 10A, the example program sequence begins with method A performing a first optimistically balanced acquisition (instruction A1) of a lock of a first object ($obj_1$). According to the process 600 of FIG. 6, associated with this first optimistically balanced acquisition is a first synchronization map entry that includes a first inflated lock flag ($inflated_1$) and a first previous lock owner ($threadID_1$). Method A then calls method B (instruction C1) which results in the corresponding synchronization map entry C1 of FIG. 10B to be stored in a synchronization map cache area. The synchronization map entry C1 includes a stack location or register that points to the locked object $obj_1$ and a stack location or register that points to the inflated lock flag $inflated_1$.

Next, method B performs a second optimistically balanced acquisition (instruction A2) of the lock of the first object $obj_1$ and a third optimistically balanced acquisition (instruction A3) of a lock of a second object $obj_2$. According to the process 600, associated with the second optimistically balanced acquisition is a second synchronization map entry that includes a second inflated lock flag ($inflated_2$) and a second previous lock owner ($threadID_2$). Similarly, associated with the third optimistically balanced acquisition is a third synchronization map entry that includes a third inflated lock flag ($inflated_3$) and a third previous lock owner ($threadID_3$). Method B then calls method C (instruction C2) which results in the corresponding synchronization map entry C2 of FIG. 10B to be stored in the synchronization map cache area. The synchronization map entry C2 includes a first set of data associated with the first object $obj_1$ and a second set of data associated with the second object $obj_2$. The first set of data includes the stack location or register that points to the locked object $obj_1$ and a stack location or register that points to the inflated lock flag $inflated_2$. The second set of data includes a stack location or register that points to the locked object $obj_2$ and a stack location or register that points to the inflated lock flag $inflated_3$.

Next, method C performs an unbalanced lock release on the lock of the first object $obj_1$. According to the process 800 of FIG. 8, the unbalanced release invokes a fix active acquires procedure that modifies the active optimistically balanced acquisitions corresponding to the first object $obj_1$ in preparation for inflating the lock associated with $obj_1$. FIG. 10C illustrates the state of the inflated lock flags stored in the synchronization map before and after the unbalanced lock release (instruction R3) is performed. As expected, before the unbalanced lock release the inflated lock flags associated with the first object $obj_1$ ($inflated_1$ and $inflated_2$) and the second object $obj_2$ ($inflated_3$) are all FALSE, thereby indicating that thin locks are associated with both objects $obj_1$ and $obj_2$. After the unbalanced lock release, the inflated lock flags associated with the first object $obj_1$ ($inflated_1$ and $inflated_2$) are set to TRUE to indicate that an inflated lock will be associated with $obj_1$ due to the unbalanced release. The example program then concludes with method B performing optimistically balanced releases on the second object $obj_2$ and the first object $obj_1$ (instructions R2 and R3, respectively), and method A performing an optimistically balanced release on the first object $obj_1$.

Figure 11:
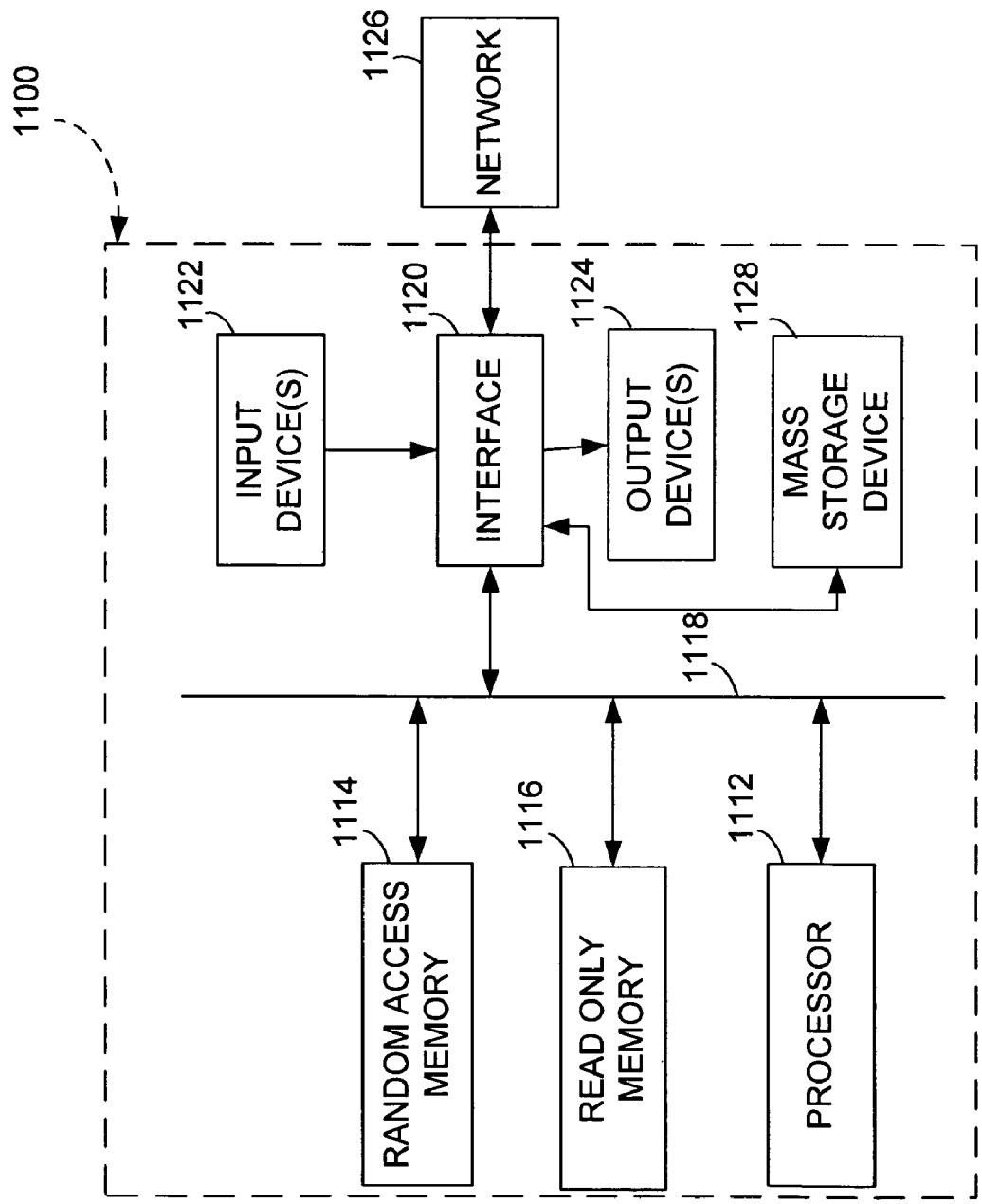
FIG. 11 is a schematic illustration of an example processor system that may carry out the processes of FIGS. 4-9 to implement the lock manager of FIG. 2.

FIG. 11 is a block diagram of an example computer or processor system 1100 capable of implementing the apparatus and methods disclosed herein. The computer 1100 can be, for example, a server, a personal computer, a personal digital assistant (PDA), an Internet appliance, or any other type of computing device.

The system 1100 of the instant example includes a processor 1112. For example, the processor 1112 can be implemented by one or more Intel® microprocessors from the Pentium® family, the Itanium® family or the XScale® family. Of course, other processors from other families are also appropriate. A processor 1112 including one or more microprocessors may be used to implement the example environment of use 100 of FIG. 1, the example lock manager 200 of FIG. 2 and/or the example processes 500, 600, 700, 800 and 900 of FIGS. 5, 6, 7, 8 and 9, respectively.

The processor 1112 is in communication with a main memory including a volatile memory 1114 and a non-volatile memory 1116 via a bus 1118. The volatile memory 1114 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is typically controlled by a memory controller (not shown) in a conventional manner.

The computer 1100 also includes a conventional interface circuit 1120. The interface circuit 1120 may be implemented by any type of well known interface standard, such as an Ethernet interface, a universal serial bus (USB), and/or a third generation input/output (3GIO) interface.

One or more input devices 1122 are connected to the interface circuit 1120. The input device(s) 1122 permit a user to enter data and commands into the processor 1112. The input device(s) can be implemented by, for example, a keyboard, a mouse, a touchscreen, a track-pad, a trackball, an isopoint and/or a voice recognition system.

One or more output devices 1124 are also connected to the interface circuit 1120. The output devices 1124 can be implemented, for example, by display devices (e.g., a liquid crystal display, a cathode ray tube display (CRT)), by a printer and/or by speakers. The interface circuit 1120, thus, typically includes a graphics driver card.

The interface circuit 1120 also includes a communication device such as a modem or network interface card to facilitate exchange of data with external computers via a network 1126 (e.g., an Ethernet connection, a digital subscriber line (DSL), a telephone line, coaxial cable, a cellular telephone system, etc.).

The computer 1100 also includes one or more mass storage devices 1128 for storing software and data. Examples of such mass storage devices 1128 include floppy disk drives, hard drive disks, compact disk drives and digital versatile disk (DVD) drives. The mass storage device 1128 and/or the volatile memory 1114 may be used to store, for example, the synchronization map maintained and modified by processes 600, 700, 800 and 900 of FIGS. 6, 7, 8 and 9, respectively.

As an alternative to implementing the methods and/or apparatus described herein in a system such as the device of FIG. 11, the methods and or apparatus described herein may alternatively be embedded in a structure such as a processor and/or an ASIC (application specific integrated circuit).

From the foregoing, persons of ordinary skill in the art will appreciate that the above disclosed methods and apparatus may be implemented in a static compiler, a managed run-time environment just-in-time (JIT) compiler, and/or directly in the hardware of a microprocessor to achieve performance optimization in executing various programs.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to lock an object comprising:
   determining a locking operation to perform on a lock corresponding to the object; is unbalanced, wherein the locking operation is unbalanced if the locking operation is not associated with a second complimentary locking operation, wherein the locking operation is performed for a thread in a managed run-time environment operating in a processing device;
   performing the locking operation by performing an optimistically balanced synchronization of the lock comprising an optimistically balanced acquisition of the lock to acquire the lock for the thread and a complimentary optimistically balanced release of the lock to release the lock for the thread if the locking operation is not unbalanced; and
   using state information associated with optimistically balanced acquisitions of the lock to allow recursive optimistically balanced acquisitions of the lock by the thread without counting the recursive optimistically balanced acquisitions of the lock, wherein the state information is not processed to count the recursive optimistically balanced acquisitions of the lock unless a subsequent unbalanced locking operation is attempted on the lock while the lock is acquired by the thread.

2. A method as defined in claim 1 further comprising modifying a lock shape of the lock if the locking operation is unbalanced and maintaining the lock shape if the locking operation is not unbalanced.

3. A method as defined in claim 2 wherein the lock shape corresponds to at least one of a first lock shape and a second lock shape, and wherein modifying the lock shape comprises converting the lock to correspond to the second lock shape if the lock shape corresponds to the first lock shape.

4. A method as defined in claim 3 wherein the first lock shape corresponds to a thin lock and the second lock shape corresponds to an inflated lock.

5. A method as defined in claim 1 wherein the optimistically balanced synchronization comprises setting a lock shape flag to indicate a lock shape of the lock during the optimistically balanced synchronization.

6. A method as defined in claim 1 wherein operation of at least one of the optimistically balanced lock acquisition and the optimistically balanced lock release is varied based on a lock shape of the lock.

7. A method as defined in claim 6 wherein the optimistically balanced lock acquisition comprises acquiring the lock by:
   setting a previous lock owner equal to a lock owner field associated with the lock and then at least one of setting or maintaining the lock owner field of the lock to correspond to the thread if the lock shape of the lock corresponds to a first lock shape; and
   performing a lock contention procedure if the lock shape corresponds to a second lock shape.

8. A method as defined in claim 6 wherein the optimistically balanced lock release comprises setting a lock owner field associated with the lock to a previous lock owner if the lock shape corresponds to a first lock shape.

9. A method as defined in claim 8 wherein, if the lock shape corresponds to the first lock shape, the lock is unlocked if the previous lock owner is a null thread and the lock is maintained for the thread if the previous lock owner is the thread.

10. A method as defined in claim 1 wherein the optimistically balanced synchronization comprises maintaining a synchronization map to store a set of active optimistically balanced acquisition states associated with a set of optimistically balanced synchronizations performed on the lock of the object.

11. A method as defined in claim 10 further comprising performing at least one of an unbalanced acquisition of the lock and an unbalanced release of the lock if the locking operation is unbalanced, and wherein performing the at least one of the unbalanced acquisition and the unbalanced release comprises determining a number of active optimistically balanced acquisition states stored in the synchronization map.

12. A method as defined in claim 11 further comprising determining a lock recursion count value corresponding to the number of active optimistically balanced acquisition states stored in the synchronization map.

13. A method as defined in claim 10 wherein the synchronization map comprises a set of synchronization map entries corresponding to the set of active optimistically balanced acquisition states, and wherein a synchronization map entry in the set of synchronization map entries comprises at least one of a previous lock owner of the lock and a lock shape flag corresponding to a lock shape of the lock.

14. A method as defined in claim 13 further comprising modifying a lock shape of the lock if the locking operation is unbalanced and maintaining the lock shape if the locking operation is not unbalanced, wherein modifying the lock shape of the lock comprises modifying the lock shape flag in the synchronization map entry.

15. A method as defined in claim 1 wherein determining whether the locking operation to perform on the lock is unbalanced comprises determining whether the locking operation is one of the optimistically balanced synchronization of the lock, a balanced synchronization of the lock, an unbalanced acquisition of the lock and an unbalanced release of the lock.

16. A computer readable storage medium storing machine readable instructions that, when executed, cause a machine to:
- determine whether a locking operation to perform for a thread on a lock corresponding to an object; is unbalanced, wherein the locking operation is unbalanced if the locking operation is not associated with a second complimentary locking operation;
- perform an optimistically balanced synchronization of the lock if the locking operation is not unbalanced by:
- performing an optimistically balanced acquisition of the lock and a complimentary optimistically balanced release of the lock; and
- using state information associated with optimistically balanced acquisitions of the lock to allow recursive optimistically balanced acquisitions of the lock by the thread without counting the recursive optimistically balanced acquisitions of the lock, wherein the state information is not processed to count the recursive optimistically balanced acquisitions of the lock unless a subsequent unbalanced locking operation is attempted on the lock while the lock is acquired by the thread; and
- modify a lock shape of the lock if the locking operation is unbalanced or maintain the lock shape if the locking operation is not unbalanced.

17. A computer readable storage medium as defined in claim 16 wherein the lock shape corresponds to at least one of a first lock shape and a second lock shape, and wherein to modify the lock shape the machine readable instructions cause the machine to convert the lock to correspond to the second lock shape if the lock shape corresponds to the first lock shape.

18. A computer readable storage medium as defined in claim 16 wherein the machine readable instructions cause the machine to maintain a synchronization map to store a set of synchronization map entries corresponding to a set of active optimistically balanced acquisition states associated with a set of optimistically balanced synchronizations performed on the lock of the object, and wherein a synchronization map entry in the set of synchronization map entries comprises at least one of a previous lock owner of the lock and a lock shape flag corresponding to the lock shape of the lock.

19. A computer readable storage medium as defined in claim 18 wherein the machine readable instructions cause the machine to perform at least one of an unbalanced acquisition of the lock and an unbalanced release of the lock if the locking operation on the lock is unbalanced, and wherein to perform the at least one of the unbalanced acquisition and the unbalanced release, the machine readable instructions cause the machine to at least one of determine the number of active optimistically balanced acquisition states stored in the synchronization map or modify at least one lock shape flag in at least one synchronization map entry of the synchronization map.

20. An apparatus to lock an object for a thread in a managed run-time environment comprising:
- an optimistically balanced lock synchronization unit to perform an optimistically balanced synchronization of a lock corresponding to the object; wherein the optimistically balanced synchronization comprises an optimistically balanced acquisition of the lock paired with a complementary optimistically balanced release of the lock; and
- a balanced synchronization state tracker/modifier to process state information maintained by the optimistically balanced synchronization unit upon occurrence of at least one of an unbalanced lock acquisition of the lock not paired with a second complimentary lock release and an unbalanced lock release of the lock not paired with a second complimentary lock acquisition, but not upon occurrence of a second subsequent optimistically balanced synchronization of the lock, to count active optimistically balanced acquisition of the lock prior to modifying a lock shape of the lock to perform the at least one of the unbalanced lock acquisition of the lock and the unbalanced lock release of the lock, at least one of the optimistically balanced lock synchronization unit or the balanced synchronization state tracker/modifier implemented by a processor or hardware.

21. An apparatus as defined in claim 20 wherein the optimistically balanced lock synchronization unit is configured to:
- acquire the lock by either setting a previous lock owner of the lock equal to a lock owner field of the lock and then at least one of setting and maintaining the lock owner field of the lock to correspond to the thread if the lock shape is a first lock shape, or performing a lock contention procedure if the lock shape corresponds to a second lock shape; and
- release the lock by resetting the lock owner field equal to the previous lock owner if the lock shape is the first lock shape.

22. An apparatus as defined in claim 20 wherein the optimistically balanced lock synchronization unit is configured to set a lock shape flag to indicate the lock shape of the lock during an optimistically balanced synchronization operation performed on the lock.

23. An apparatus as defined in claim 20 wherein the optimistically balanced lock synchronization unit comprises a synchronization map to store the state information comprising a set of active optimistically balanced acquisition states corresponding to a set of optimistically balanced synchronizations performed on the lock of the object.

24. An apparatus as defined in claim 23 wherein the synchronization map comprises a set of synchronization map entries corresponding to the set of active optimistically balanced acquisition states, and wherein a synchronization map entry in the set of synchronization map entries comprises at least one of a previous lock owner of the lock and a lock shape flag corresponding to the lock shape of the lock.

25. An apparatus as defined in claim 24 wherein the balanced synchronization state tracker/modifier is configured to process the state information stored in the synchronization map by at least one of determining a number of active optimistically balanced acquisition states stored in the synchronization map and modifying at least one lock shape flag in at least one synchronization map entry of the synchronization map.

26. An apparatus as defined in claim 20 wherein the optimistically balanced synchronization unit is configured to perform a second recursive optimistically balanced synchronization of the lock without counting a number of active optimistically balanced acquisitions of the lock.

27. An apparatus as defined in claim 20 further comprising at least one of an unbalanced lock acquisition unit to perform an unbalanced acquisition of the lock and an unbalanced lock release unit to perform an unbalanced release of the lock, and wherein the at least one of the unbalanced lock acquisition unit and the unbalanced lock release unit is configured to modify the lock shape of the lock.

28. A system to lock an object for a thread in a managed run-time environment comprising:
a processor configured to:
determine whether a locking operation to perform on a lock corresponding to the object is unbalanced, wherein the locking operation is unbalanced if the locking operation is not associated with a second complimentary locking operation;
perform an optimistically balanced synchronization of the lock comprising an optimistically balanced acquisition of the lock and a complimentary optimistically balanced release of the lock if the locking operation is not unbalanced, wherein a lock shape of the lock used to perform the optimistically balanced synchronization of the lock is maintained in a first lock shape until a subsequent unbalanced locking operation is attempted on the lock, wherein the first lock shape is unable to track a number of recursive acquisitions of the lock; and
modify the lock shape of the lock to a second lock shape if the locking operation is unbalanced, wherein the second lock shape is able to track the number of recursive acquisitions of the lock; and
a memory to store at least one of a lock owner field of the lock, a previous lock owner of the lock and a lock shape flag corresponding to the lock shape of the lock.

29. A system as defined in claim 28 wherein the processor is configured to store a synchronization map in the memory comprising a set of synchronization map entries corresponding to a set of active optimistically balanced acquisition states associated with a set of optimistically balanced synchronizations performed on the lock of the object, wherein the synchronization map is used by the processor to modify the lock shape from the first lock shape to the second lock shape, and wherein a synchronization map entry in the set of synchronization map entries comprises at least one of a previous lock owner of the lock and a lock shape flag corresponding to the lock shape of the lock.

30. A system as defined in claim 29 wherein the processor is configured to perform at least one of an unbalanced acquisition of the lock and an unbalanced release of the lock if the locking operation on the lock is unbalanced, and wherein to perform the at least one of the unbalanced acquisition and the unbalanced release, the processor is configured to modify the lock shape from the first lock shape to the second lock shape by at least one of determining the number of active optimistically balanced acquisition states stored in the synchronization map and modifying at least one lock shape flag in at least one synchronization map entry of the synchronization map.

* * * * *

UNITED STATES PATENT AND TRADEMARK OFFICE
CERTIFICATE OF CORRECTION

PATENT NO. : 7,567,963 B2  Page 1 of 1
APPLICATION NO. : 10/878210
DATED : July 28, 2009
INVENTOR(S) : Shpeisman et al.

It is certified that error appears in the above-identified patent and that said Letters Patent is hereby corrected as shown below:

Col. 19 line 36: the text "determining a locking operation" should read -- determining whether a locking operation --

Col. 19 line 37: the text "corresponding to the object; is unbalanced" should read -- corresponding to the object is unbalanced --

Col. 21 line 5: the text "thread on a lock corresponding to an object; is unbalanced" should read -- thread on a lock corresponding to an object is unbalanced --

Col. 21 line 59: the text "lock corresponding to the object; wherein the optimistically" should read -- lock corresponding to the object, wherein the optimistically --

Col. 22 line 6: the text "optimistically balanced acquisition of the lock prior to modifying" should read -- optimistically balanced acquisitions of the lock prior to modifying --

Signed and Sealed this

Twenty-second Day of September, 2009

David J. Kappos
*Director of the United States Patent and Trademark Office*